(12) United States Patent
Kurose et al.

(10) Patent No.: US 8,422,471 B2
(45) Date of Patent: Apr. 16, 2013

(54) INFORMATION PROCESSING APPARATUS, AND CONNECTION ESTABLISHMENT METHOD THEREFOR

(75) Inventors: Kengo Kurose, Tokyo (JP); Takashi Minemura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 273 days.

(21) Appl. No.: 12/877,198

(22) Filed: Sep. 8, 2010

(65) Prior Publication Data

US 2011/0222516 A1  Sep. 15, 2011

(30) Foreign Application Priority Data

Mar. 15, 2010 (JP) .................................. P2010-58214

(51) Int. Cl.
*H04W 4/00* (2009.01)
(52) U.S. Cl.
USPC ........................................ 370/338; 455/552.1
(58) Field of Classification Search .......... None
See application file for complete search history.

(56) References Cited

U.S. PATENT DOCUMENTS

| | | | | |
|---|---|---|---|---|
| 6,377,608 B1 * | 4/2002 | Zyren | ........................... | 375/132 |
| 6,449,246 B1 * | 9/2002 | Barton et al. | .................. | 370/210 |
| 6,763,013 B2 * | 7/2004 | Kennedy | ....................... | 370/338 |
| 6,980,522 B2 * | 12/2005 | Boyle | ........................... | 370/252 |
| 7,149,486 B2 * | 12/2006 | Kurose | ...................... | 455/226.2 |
| 7,342,907 B2 * | 3/2008 | Kim et al. | ..................... | 370/338 |
| 7,379,447 B2 * | 5/2008 | Dunagan et al. | ............. | 370/350 |
| 7,403,744 B2 * | 7/2008 | Bridgelall | .................... | 455/41.2 |
| 7,633,924 B2 * | 12/2009 | Fujii et al. | ..................... | 370/343 |
| 7,733,818 B2 * | 6/2010 | Twitchell, Jr. | ................ | 370/311 |
| 7,995,547 B1 * | 8/2011 | Barratt | ........................... | 370/338 |
| 8,160,082 B2 * | 4/2012 | Harris et al. | ................... | 370/401 |
| 8,203,990 B2 * | 6/2012 | Watanabe et al. | ............. | 370/315 |
| 2003/0026213 A1 * | 2/2003 | Frank et al. | ..................... | 370/254 |
| 2003/0134638 A1 * | 7/2003 | Sundar et al. | .................. | 455/435 |
| 2003/0235175 A1 * | 12/2003 | Naghian et al. | ................ | 370/338 |

(Continued)

FOREIGN PATENT DOCUMENTS

| | | |
|---|---|---|
| JP | 2006-325175 A | 11/2006 |
| JP | 2009-089434 A | 4/2009 |
| JP | 2010-33691 A | 2/2010 |
| WO | 2008/102434 A1 | 8/2008 |

OTHER PUBLICATIONS

Japanese Office Action dated Jun. 7, 2011, issued in counterpart Japanese Application No. 2010-058214, and English translation thereof.

*Primary Examiner* — Bunjob Jaroenchonwanit
(74) *Attorney, Agent, or Firm* — Holtz, Holtz, Goodman & Chick, P.C.

(57) ABSTRACT

According to an embodiment, a information processing apparatus includes a wireless communication unit, a first search unit, and a connection unit. The wireless communication unit performs wireless communication with another apparatus which is utilizable as a wireless base station. The first search unit is configured to: use the wireless communication unit to sequentially transmit, in a second transmission period different from a first transmission period, plural of first identification signals having different center frequencies within a frequency band usable by the wireless communication unit, as an activation request signal for requesting activation of a wireless communication unit included in the another apparatus; repeatedly transmit, in a first repetition period, the first signals in the frequency band; and search for the another apparatus. The connection unit uses the communication unit to establish connection with the another apparatus which is searched for.

19 Claims, 18 Drawing Sheets

U.S. PATENT DOCUMENTS

| | | | |
|---|---|---|---|
| 2004/0105434 A1* | 6/2004 | Baw | 370/355 |
| 2004/0174845 A1* | 9/2004 | Koo et al. | 370/328 |
| 2005/0113978 A1* | 5/2005 | Sharma et al. | 700/259 |
| 2005/0148326 A1* | 7/2005 | Nogawa et al. | 455/420 |
| 2006/0068795 A1* | 3/2006 | Caspi et al. | 455/445 |
| 2006/0068815 A1* | 3/2006 | Caspi et al. | 455/466 |
| 2006/0084427 A1* | 4/2006 | Kurose | 455/423 |
| 2007/0053315 A1* | 3/2007 | Sugaya | 370/318 |
| 2007/0127427 A1* | 6/2007 | Tanaka | 370/338 |
| 2007/0287421 A1* | 12/2007 | Kirke | 455/411 |
| 2008/0002640 A1* | 1/2008 | Westphal | 370/338 |
| 2008/0013480 A1* | 1/2008 | Kapoor et al. | 370/328 |
| 2008/0019339 A1* | 1/2008 | Raju et al. | 370/338 |
| 2008/0026740 A1* | 1/2008 | Netanel | 455/419 |
| 2008/0026788 A1* | 1/2008 | Hamada | 455/552.1 |
| 2008/0045159 A1* | 2/2008 | Mashimo et al. | 455/68 |
| 2008/0049688 A1* | 2/2008 | Nakfour et al. | 370/338 |
| 2008/0107089 A1* | 5/2008 | Larsson et al. | 370/338 |
| 2008/0154099 A1* | 6/2008 | Aspel et al. | 600/301 |
| 2008/0240145 A1* | 10/2008 | Adamovsky et al. | 370/449 |
| 2008/0279163 A1* | 11/2008 | Desai | 370/338 |
| 2008/0310351 A1* | 12/2008 | Hansen et al. | 370/328 |
| 2009/0067370 A1* | 3/2009 | Kim et al. | 370/328 |
| 2009/0213828 A1* | 8/2009 | Brundage et al. | 370/338 |
| 2010/0019814 A1* | 1/2010 | Park | 327/162 |
| 2010/0035587 A1* | 2/2010 | Bennett | 455/414.1 |
| 2010/0035629 A1* | 2/2010 | Soliman | 455/455 |
| 2010/0103909 A1* | 4/2010 | Lee et al. | 370/338 |
| 2010/0118848 A1* | 5/2010 | Satou | 370/338 |
| 2010/0142502 A1* | 6/2010 | Shiraki | 370/338 |
| 2010/0172335 A1* | 7/2010 | Mok | 370/338 |
| 2010/0303049 A1* | 12/2010 | Ibrahim et al. | 370/338 |
| 2011/0273276 A1* | 11/2011 | Minemura et al. | 340/10.1 |
| 2012/0026941 A1* | 2/2012 | Ahmad et al. | 370/328 |
| 2012/0069766 A1* | 3/2012 | Fu et al. | 370/252 |
| 2012/0176648 A1* | 7/2012 | Nakamura | 358/1.15 |

* cited by examiner

FIG. 6A

| UW | COMMAND | ACTIVATION APPLICATION |
|---|---|---|
| VALUE A | COMMAND X | APPLICATION 1 |
| VALUE B | COMMAND Y | APPLICATION 2 |
| VALUE C | COMMAND Z | APPLICATION 3 |

FIG. 6B

| PERSONAL UW | VALUE K |
|---|---|

INFORMATION PROCESSING APPARATUS, AND CONNECTION ESTABLISHMENT METHOD THEREFOR

CROSS-REFERENCE TO RELATED APPLICATION

This application is based upon and claims the benefit of priority from Japanese Patent Application No, 2010-058214, filed Mar. 15, 2010; the entire contents of which are incorporated herein by reference.

FIELD

The present invention relates to an information processing apparatus and a connection establishment method therefore.

BACKGROUND

In recent years, a WiFi mounting rate of a personal computer (PC) is extremely high, whereas a cellar system mounting rate of a PC is still low. Therefore, the following service is performed. That is, data communication is first performed via a base station by utilizing a cell phone mounted a cellar system having a high cover rate of a wireless communication area, a PC and the cell phone are connected with each other by utilizing a WiFi communication module (WLAN communication module) or a Bluetooth communication module included in this cell phone. And the cell phone transfers data obtained via the base station to the PC. In this case, a user operates the cell phone to make settings for performing the above-mentioned series of service, whereby the service between the cell phone and the PC is started. Incidentally, WiFi is a name indicating that the connectivity between wireless LAN (WLAN) devices utilizing communication standards of IEEE802.11a or IEEE802.11b is certified by the Wi-Fi Alliance.

Recently, a chip applied a standby power consumption minimizing technology has also been known (see, for example, JP2009-89434A). The chip (hereinafter, referred to as "EcoChip") is mounted on a cell phone, and then the cell phone is applied to the above-mentioned service, which makes it possible to always monitor a service request (connection request) from a PC by the EcoChip. More specifically, through the application of the EcoChip to the above-mentioned service, the cell phone performs local communication between the PC, so that the WLAN communication module which has large power consumption can be powered off, and the connection request from the PC at the other end can regularly be monitored by the EcoChip having small power consumption. As a result, it is possible to omit, at low power consumption, a user's work of directly operating the cell phone. Here, the EcoChip included in the cell phone judges on the basis of only a reception strength on a time axis whether or not a received signal is an activation request signal for requesting the activation of a WLAN communication module of a cell phone 1 which is utilizable as an AP. In view of this, the EcoChip detects a continuous signal transmitted by a unique transmission series or in a constant period.

Three systems are conceivable as a system in which a PC utilizes a WLAN communication module included in the PC to transmit radio waves. The first transmission system is a system in which the PC changes a mode of the WLAN communication module into an AP mode to transmit a Beacon signal by using the WLAN communication module. The second transmission system is a system in which the PC changes the mode of the WLAN communication module into an Adhoc mode to transmit a Beacon signal by using the WLAN communication module. Further, the third transmission system is a system in which the PC changes the mode of the WLAN communication module into an STA mode (STATION mode) and sets a scanning system in the STA mode to Active Scan to transmit a Probe Request signal by using the WLAN communication module.

However, in a conventional WiFi communication system, a de facto transmission period of a Beacon signal of an AP is 102.4 ms, and hence both a transmission period of the first transmission system and a transmission period of the second transmission system are basically the same as the de facto transmission period of 102.4 ms. Therefore, in the above-mentioned service, it has been difficult for the cell phone which communicates with the PC by using the WLAN communication module to distinguish a normal Beacon signal from the AP and a Beacon signal from the PC.

In addition, a transmission period of the third transmission system is also the de facto transmission period (102.4 ms) of the Beacon signal of the AP in many cases. Therefore, similarly to the first transmission system and the second transmission system, in the above-mentioned service, it has been difficult for the cell phone which communicates with the PC by using the WLAN communication module to distinguish the normal Beacon signal from the AP and the Probe Request signal from the PC.

Further, the PC scans every WiFi channel for each predetermined search period, and for the purpose of electric power saving, the PC remains in a sleep state until the next search is performed and intermittently wakes up for each search period (this series of operations is referred to as "intermittent operation"). Accordingly, for example, in the case where the EcoChip included in the cell phone adopts a detection algorithm which requires a certain number of samples due to a narrow bandpass filter and the like, the number of samples corresponds to the number of WiFi channels (WLAN channels), so that the PC cannot continue to transmit, in a constant period, the number of samples of Probe Request signals which enables detecting the Probe Request signals. Therefore, in the case of the third transmission system, in addition to the difficulty in distinguishing the normal Beacon signal from the AP and the Probe Request signal from the PC, the cell phone which communicates with the PC by using the WLAN communication module cannot secure the number of samples of Probe Request signals, which leads to a subject in reception characteristics of the EcoChip.

BRIEF DESCRIPTION OF THE DRAWINGS

In the accompanying drawings:

FIGS. 6A and 6B are diagrams showing an example of a UW table;

DETAILED DESCRIPTION

An embodiment of the present invention has been made in consideration of the circumstances above and an object thereof is to provide an information processing apparatus capable of suitably establishing connection with another information processing apparatus, and a connection establishment method therefore.

To achieve the above object, an information processing apparatus of the present invention includes a wireless communication unit, a first search unit, and a connection unit. The wireless communication unit performs wireless communication with another apparatus which is utilizable as a wireless base station. The first search unit is configured to: use the wireless communication unit to sequentially transmit, in a second transmission period different from a first transmission period, plural of first identification signals having different center frequencies within a frequency band usable by the wireless communication unit, as an activation request signal for requesting activation of a wireless communication unit included in the another apparatus; repeatedly transmit, in a first repetition period, the first signals in the frequency band; and search for the another apparatus. The connection unit uses the communication unit to establish connection with the another apparatus which is searched for.

Hereinafter, an embodiment of the present invention is described with reference to the drawings.

Figure 1:
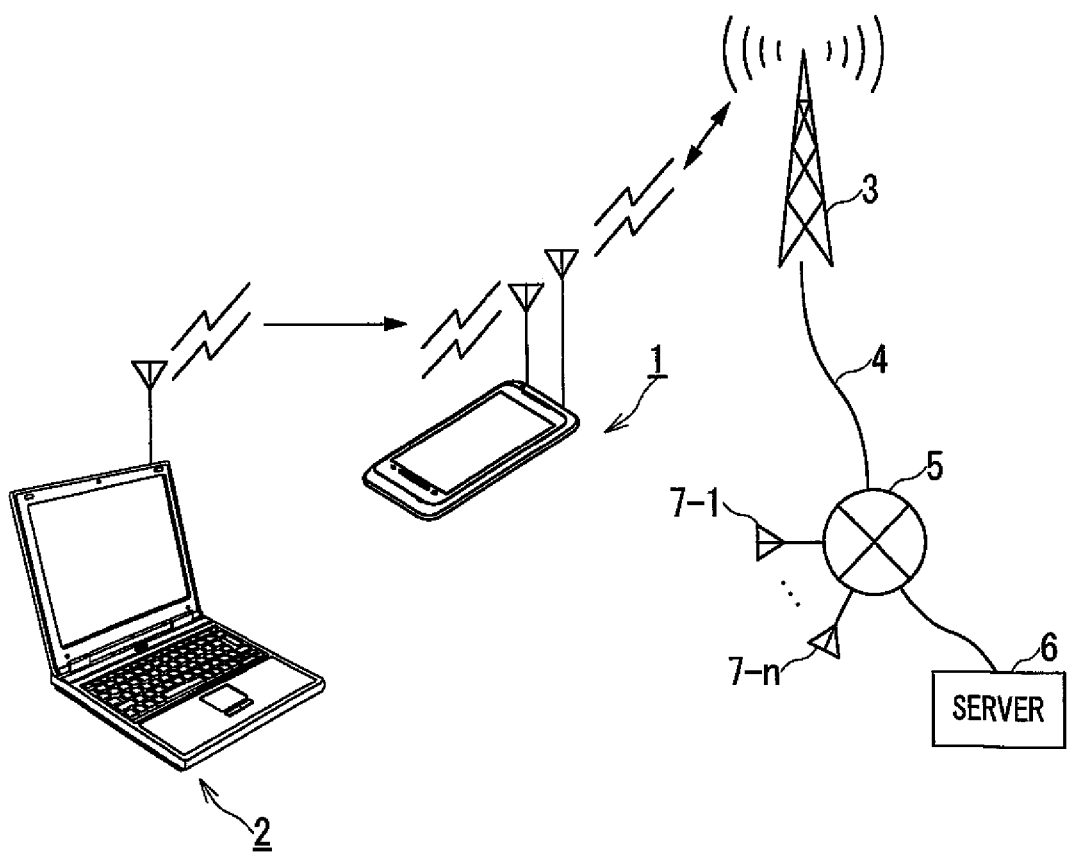
FIG. 1 illustrates a network formed between information processing apparatuses.

FIG. 1 illustrates a network formed between information processing apparatuses according to the present embodiment.

In the present embodiment, a local network is formed between a cell phone 1 and a notebook personal computer (hereinafter, simply referred to as "PC") 2. The cell phone 1 and the PC 2 may be applicable to the information processing apparatus according to the present invention. In the present embodiment, although the cell phone 1 and the PC 2 are applied and describes as the information processing apparatus, but various communication devices having a communication function, for example, a PDA (Personal Digital Assistant), a portable game machine, a portable music player, and a portable moving image player may be applied to the information processing apparatus according to the present invention.

The cell phone 1 uses a communication system exemplified by a W-CDMA system to transmit and receive sounds and data to and from a base station 3 included in a mobile communication network. The base station 3 is connected to Internet 5 via a predetermined public line network 4. A server 6 is connected to the Internet 5. The PC 2 can communicate with a cell phone 1 corresponding to another information processing apparatus by utilizing, for example, a communication unit of a WLAN (Local Area Network). The cell phone 1 is capable of first performing data communication with the server 6 via the base station 3, utilizing a WLAN communication module included in the cell phone 1 to connect to the PC 2, and transferring data obtained via the base station 3 to the PC 2. APs (access points; wireless base stations) 7-1 to 7-n for the WLAN are connected to the Internet 5 by wired lines. The PC 2 can connect to the APs 7-1 to 7-n via the WLAN communication module (WLAN communication module 112 of FIG. 7). The APs 7-1 to 7-n will collectively be referred to as "APs 7" unless especially required to distinguish one from another. In terms of a consumption current, it is preferable to realize wireless communication between the cell phone 1 and the PC 2 at a distance of several meters.

Figure 2:
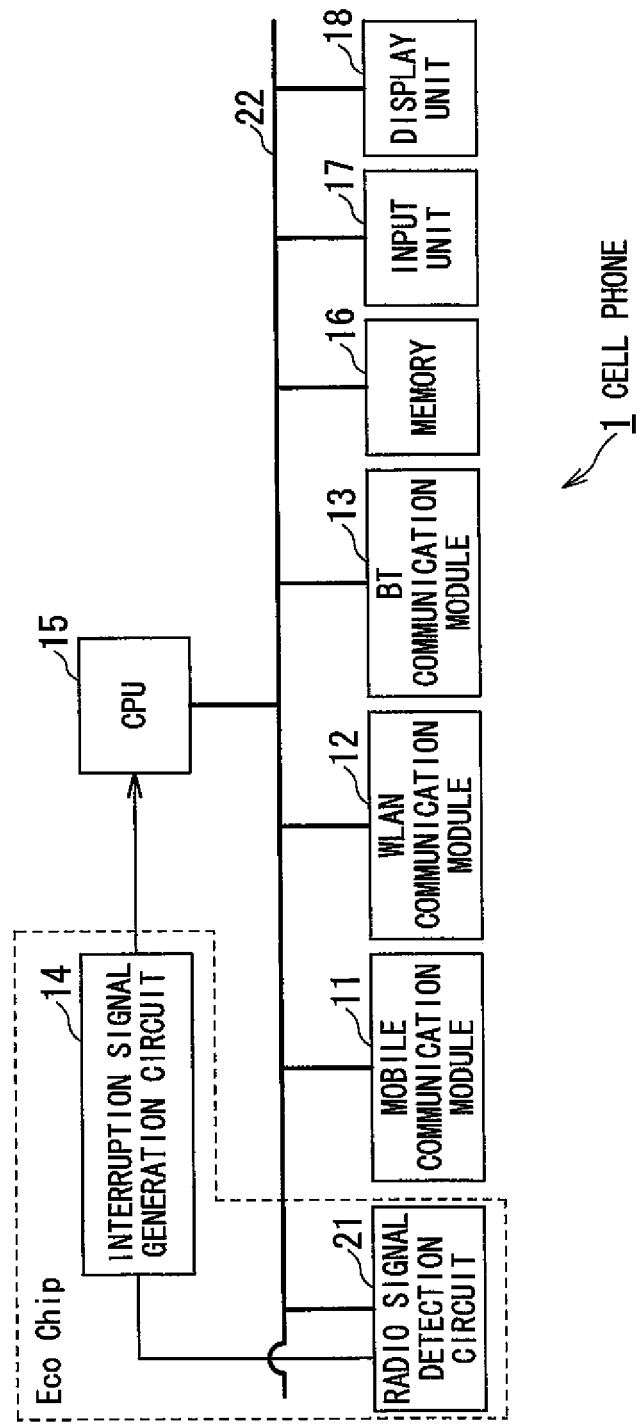
FIG. 2 is a hardware system block diagram of a cell phone, or an information processing apparatus.

FIG. 2 is a hardware system block diagram of the cell phone 1, or an information processing apparatus.

A configuration for realizing wireless communication with the PC 2 as one of other information processing apparatuses will be mainly described for the cell phone 1 in the present embodiment, and details of a hardware system configuration generally included in cell phones will not be described.

The cell phone 1 comprises a mobile communication module 11, a wireless LAN (WLAN) communication module 12, a Bluetooth (BT) communication module 13, an interruption signal generation circuit 14, a CPU 15, a memory 16, an input unit 17, a display unit 18, and a radio signal detection circuit 21. The components of the cell phone 1 are connected through a bus 22.

The mobile communication module 11 transmits and receives of sound and data to and from the base station 3. The mobile communication module 11 comprises an antenna and receives radio signals through the space transmitted by a predetermined communication processing system from the base station 3 in the mobile communication network. The mobile communication module 11 also emits a predetermined radio signals to the space through the antenna toward the base station 3 to allow wireless communication by a predetermined communication processing system. The mobile communication module 11 performs predetermined processing to the received signals and then outputs data to the CPU 15 or outputs sound from a speaker (not shown). The mobile communication module 11 also executes predetermined processing to data outputted by the CPU 15 and sound collected by a microphone (not shown) and then transmits them.

The wireless LAN (WLAN) communication module 12 performs wireless LAN communication compliant with a predetermined standard, such as IEEE 802.11a/b/g, through the antenna.

The Bluetooth (BT) communication module 13 wirelessly communicates with other communication devices existing in proximity (e.g., several to ten-odd meters) to the cell phone 1 through an antenna.

The CPU (Central Processing Unit) 15 generates and supplies various control signals to control the components of the cell phone 1. The CPU 15 executes various processes according to programs stored in a ROM (Read Only Memory) or various application programs or control programs including an operating system (OS) loaded from the ROM to a RAM (Random Access Memory).

The memory 16 is a storage device such as a ROM, a RAM, a flash memory device, and an HDD (Hard Disc Drive).

The input unit 17 receives input through, for example, an operation key-type input unit or a touch panel-type input unit and transfers the input signal to the CPU 15. The display unit 18 displays data including characters or images under the control of the CPU 15. The display unit 18 is constituted by, for example, an LCD (Liquid Crystal Display), an organic EL (ElectroLuminescence) display, and an inorganic EL display.

The radio signal detection circuit 21 is a circuit for detecting an amplitude-modulated (on-off keying) radio signals. The radio signal detection circuit 21 determines the type of the radio signals based on a signal pattern of the radio signals received from the PC 2. The signal pattern is judged based on a period between successive signals and a level of each signal detected along the time axis.

The radio signal detection circuit 21 outputs a predetermined interruption signal to the interruption signal generation circuit 14 if a specific activation request signal included the received signal is detected. The interruption signal generation circuit 14 generates an interruption signal based on the signal outputted by the radio signal detection circuit 21 and outputs the signal to the CPU 15 to notify the CPU 15 of generating an interruption process. Incidentally, the interrupt signal generation circuit 14 and the radio signal detection circuit 21 are formed into one chip as an EcoChip. The radio signal detection circuit 21 alone may be formed into one chip as an EcoChip without the interrupt signal generation circuit 14.

The WLAN communication module 12 and the BT communication module 13 have functions of obtaining data by down-converting and decoding the received radio signals and functions of transmitting data (encoding, modulating, and radio signal transmission). Therefore, the operating power of the communication module 12 and 13 are higher than that in the radio signal detection circuit 21. More specifically, the radio signal detection circuit 21 is capable of waiting for the predetermined radio signals by lower operating power than the operating power when the module 12 and 13 monitor the predetermined radio signals sent out from the PC 2. Therefore, instead of the communication module 12 and 13, the radio signal detection circuit 21 of the cell phone 1 in the present embodiment waits for the radio signal to reduce the power consumption of the whole system of the cell phone 1.

The circuits of the radio signal detection circuit 21 are constituted by applying conventional techniques capable of realizing power saving described in documents shown in a descriptions of circuits. Additionally, the radio signal detection circuit 21 can have not only the configurations described in the documents described below, but can have any configurations as long as the radio signal can be at least monitored by lower operating power than the operating power when the communication module 12 and 13 monitor the radio signal sent out by the PC 2.

Figure 3:
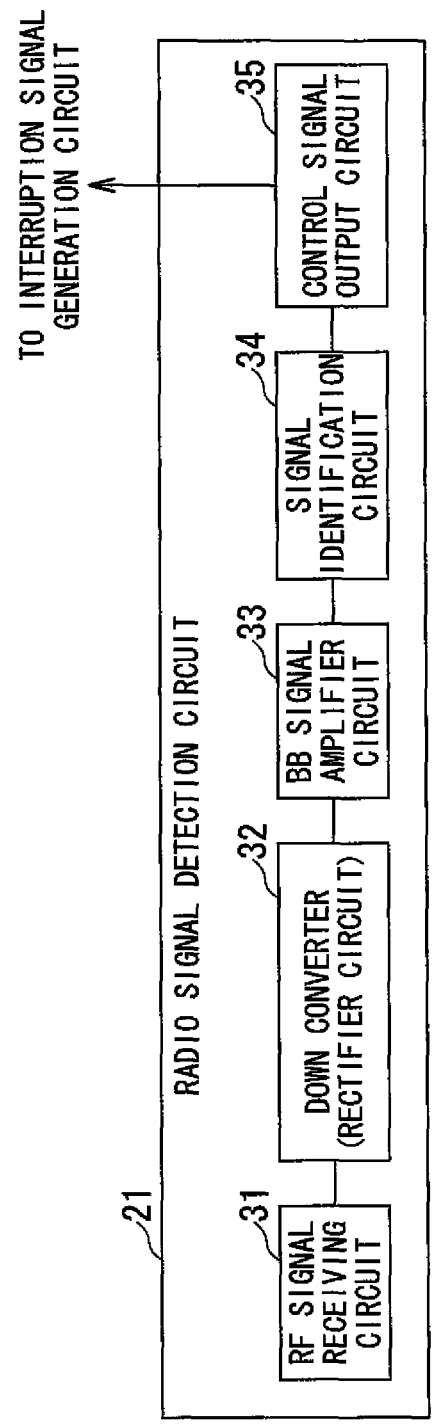
FIG. 3 is a circuit block diagram of a radio signal detection circuit of FIG. 2.

FIG. 3 is a circuit block diagram of the radio signal detection circuit 21 of FIG. 2.

The radio signal detection circuit 21 comprises an RF signal receiving circuit 31, a down converter (rectifier circuit) 32, a baseband (BB) signal amplifier circuit 33, a signal identification circuit 34, and a control signal output circuit 35. Among the components, the RF signal receiving circuit 31, the down converter 32, and the BB signal amplifier circuit 33 are constituted by analog circuits. The signal identification circuit 34 and the control signal output circuit 35 are constituted by digital circuits.

When a radio signal (radio wave) reaching a detection sensitivity sent out by another communication device, such as an AP and the PC 2, is received, the RF (Radio Frequency) signal receiving circuit 31 amplifies the signal and outputs the signal to the down converter 32.

The down converter (rectifier circuit) 32 rectifies and detects an RF signal outputted from the RF signal receiving circuit 31 to acquire a demodulation signal. The down converter 32 does not include a local oscillator in order to save power. A technique described, for example, in JP4377946B (demodulation apparatus) can be applied to the configuration of the down converter 32.

The BB signal amplifier circuit 33 amplifies the demodulation signal outputted from the down converter 32. A technique described, for example, in JP2009-89434A (trigger signal generation apparatus) can be applied to the configuration of the BB signal amplifier circuit 33.

The signal identification circuit 34 compares the signal generated by the BB signal amplifier circuit 33 with a predetermined reference potential. Although a plurality of values can be set for the reference potential, it is preferable to set a lower threshold to allow detection of all signals including low level ones. The signal identification circuit 34 generates binary signals based on the comparison result. Then the signal identification circuit 34 identifies whether the received radio signal corresponds to a waiting activation request signal, and outputs the identification result to the control signal output circuit 35. The control signal output circuit 35 generates a control signal for notifying an occurrence of an interruption process based on the identification result outputted by the signal identification circuit 34 and outputs the interruption signal to the interruption signal generating circuit 14. The control signal output circuit 35 also executes a writing process to allow the CPU 15 to read the content of the interruption process.

Figure 4:
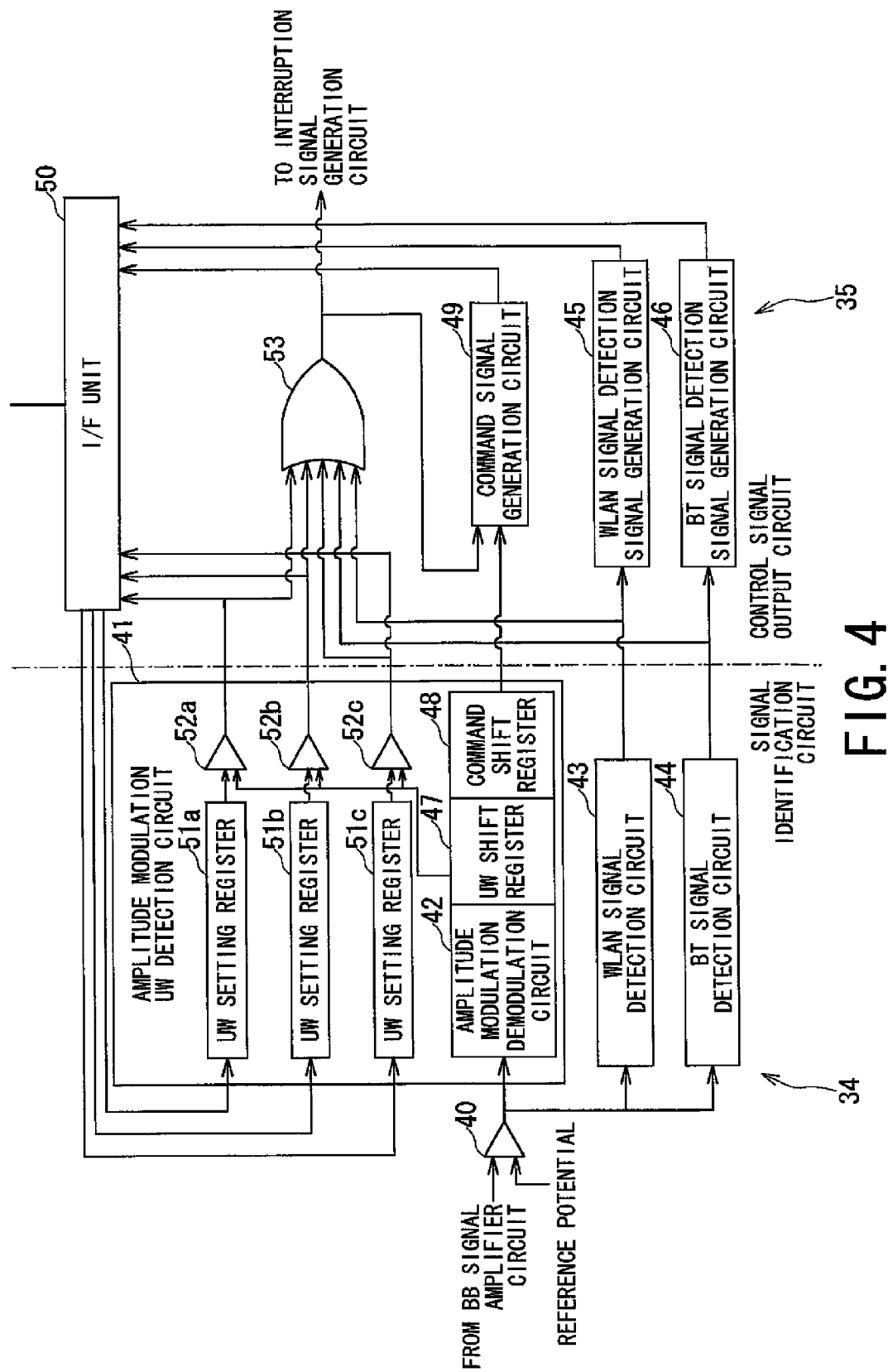
FIG. 4 is a detailed block diagram of a signal identification circuit and a control signal output circuit of FIG. 3.

FIG. 4 is a detailed block diagram of the signal identification circuit 34 and the control signal output circuit 35 of FIG. 3.

The left side of the alternate long and short dash line in FIG. 4 denotes the signal identification circuit 34, and the right side of it denotes the control signal output circuit 35.

A comparator 40 of the signal identification circuit 34 compares the signal supplied from the BB signal amplifier circuit 33 and a reference potential. The comparator 40 determines that the supplied signal is a high level if a potential of the supplied signal is equal to or higher than the reference potential. The comparator 40 determines that the supplied signal is a low level if a potential of the supplied signal is lower than the reference potential. The comparator 40 outputs the comparison result to an amplitude modulation demodulation circuit 42 of an amplitude modulation unique word (UW) detection circuit 41, a wireless LAN (WLAN) signal detection circuit 43, and a Bluetooth (BT) signal detection circuit 44.

The WLAN signal detection circuit 43 detects whether the obtained signal corresponds to an envelope pattern of an output signal (hereinafter referred to as "WLAN signal") from a WLAN communication module 112 (see the FIG. 7) of the PC 2. The BT signal detection circuit 44 detects whether the obtained signal corresponds to an envelope pattern of an output signal (hereinafter referred to as "BT signal") from a BT communication module 113 (see the FIG. 7) of the PC 2 during inquiry scan. If the detection circuit 43 and 44 each detect an envelope pattern, the detection circuit 43 and 44 notify a WLAN signal detection signal generation circuit 45 and a Bluetooth (BT) signal detection signal generation circuit 46, respectively.

The amplitude modulation demodulation circuit 42 of the UW detection circuit 41 executes a process of demodulating the obtained signal. The demodulated signal is a signal (hereinafter referred to as "UW signal") including a unique word (hereinafter referred to as "UW") and a command sent out by the PC 2. The amplitude modulation demodulation circuit 42 executes the demodulation process to acquire the UW and the command.

The signal outputted by the amplitude modulation demodulation circuit 42 is supplied to a unique word (UW) shift register 47 and a command shift register 48. If the correspondence of the signals supplied to the UW shift register 47 with the UW set to at least one of UW setting registers 51 is detected, a command signal generation circuit 49 generates a command signal for the CPU 15 to read out through an interface (I/F) unit 50 in an interruption process.

Unique word (UW) setting registers 51a, 51b, and 51c (hereinafter referred to collectively as the UW setting registers 51 when there is no need to distinguish individual the UW setting registers) each store a UW set by the CPU 15. Comparators 52a, 52b, and 52c (collectively, comparators 52) determine whether a signal supplied to the UW shift register 47 correspond to any of UWs set to the UW setting registers 51. As a plurality of (three in the present embodiment) UW setting registers 51 and comparators 52 are each prepared, the cell phone 1 can set plural UW set with a plurality of communication terminals. Therefore, the cell phone 1 can simultaneously wait for connection request signals from plural different terminals.

A technique described, for example, in JP2009-33445A (receiving apparatus and method) can be applied as a specific configuration for supplying a signal to the UW shift register 47 and comparing the signal with a UW stored in the UW setting registers 51.

If the detection circuit 43 or the BT signal detection circuit 44 detects signals, or if the correspondence of a signals supplied to the UW shift register 47 with a UW set in at least one of the UW setting registers 51 is detected in the comparators 52, the an OR circuit 53 each receives notification. If the OR circuit 53 received the notification, the OR circuit 53 outputs a signal to the interruption signal generation circuit 14. The detection signal generation circuit 45, the detection signal generation circuit 46, and the comparators 52 each output a signal including a content of an interruption process to the I/F unit 50. The signal is read by the CPU 15.

Figure 5:
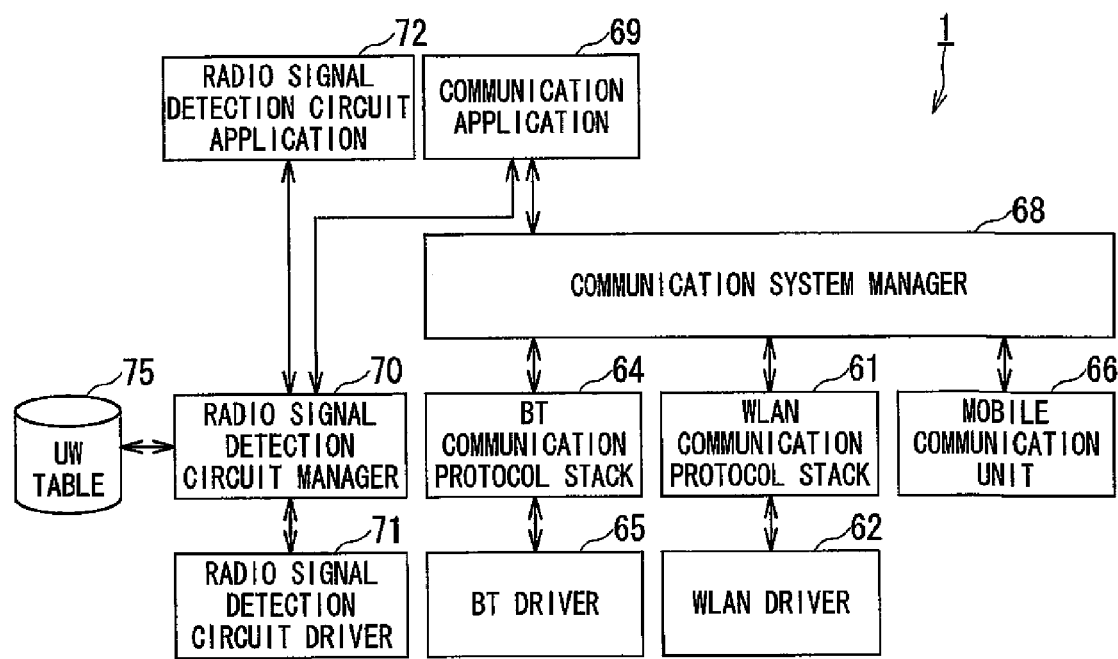
FIG. 5 is a software system block diagram of a cell phone.

FIG. 5 is a software system block diagram of the cell phone 1.

A configuration for realizing wireless communication with the PC 2 will be mainly described for the cell phone 1 in the present embodiment, and details of a software system configuration generally included in cell phones will not be described.

A WLAN communication protocol stack 61 executes a predetermined WLAN communication procedure. A wireless LAN (WLAN) driver 62 controls the WLAN communication module 12 to perform the procedure executed by the WLAN communication protocol stack 61.

A Bluetooth (BT) communication protocol stack 64 executes a predetermined BT communication procedure. A Bluetooth (BT) driver 65 controls the BT communication module 13 to perform the procedure executed by the BT communication protocol stack 64.

A mobile communication unit 66 performs wireless communication by controlling the mobile communication module 11 during communication through a common carrier network of voice call, data communication, etc. of the cell phone 1.

A communication system manager 68 manages the WLAN communication protocol stack 61, the BT communication protocol stack 64, and the mobile communication unit 66. A communication application 69 directly receives, for example, a communication instruction from the user and notifies the communication system manager 68 of the instruction.

A radio signal detection circuit manager 70 comprehensively controls the radio signal detection circuit 21 and communicates with the applications. A radio signal detection circuit driver 71 operates the radio signal detection circuit 21 under the control of the radio signal detection circuit manager 70. A radio signal detection circuit application 72 receives, for example, an instruction and input data from the user and notifies the radio signal detection circuit manager 70 of the instruction and the input data.

A unique word (UW) table 75 stores at least one UW set by the user or at least one UW specific to applications.

FIGS. 6A and 6B are diagrams showing an example of a UW table.

As shown in FIG. 6A, the UW table 75 stores the UW associated with command and application. The UW is identification information used to identify each of terminals requesting wireless communication. The commands indicate the content of the processes that are executed in the cell phone 1. The applications are applications allocated with activations based on the combinations of the UW and the commands. As shown in FIG. 6B, the UW table 75 also stores at least one personal UW generated by a radio signal detection circuit application. The personal UW is the UW being specific between terminals and optionally set by the user. Not only the UWs specific to the applications, but also any UW sets by the user can be used as the UW allocated to the activations of the applications. In that case, the personal UW stored in FIG. 6B may be used.

Figure 7:
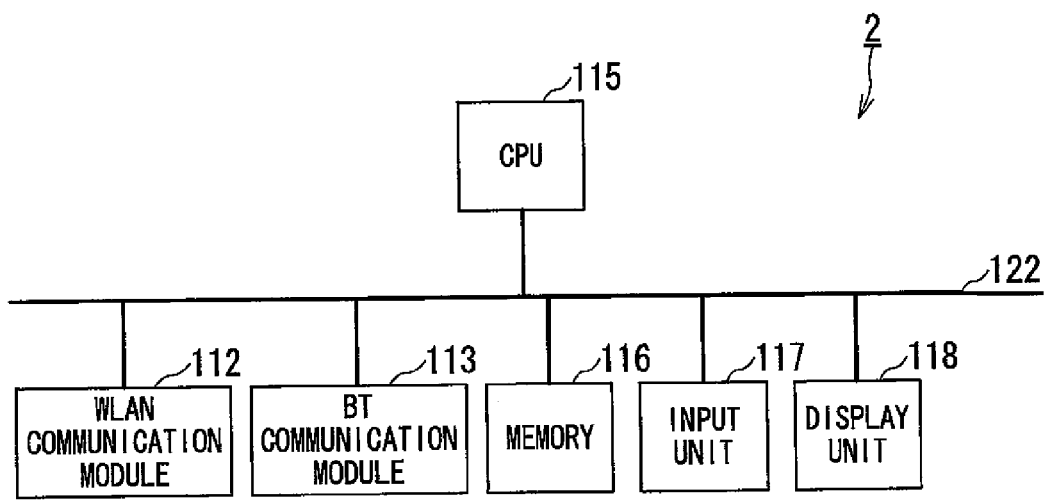
FIG. 7 is a hardware system block diagram of a PC as a communication device in an embodiment.

FIG. 7 is a hardware system block diagram of the PC 2 as an information processing apparatus in the present embodiment. A configuration for realizing wireless communication with the cell phone 1 as one of other information processing apparatuses will be mainly described for the PC 2 in the present embodiment, and details of a hardware system configuration generally included in PCs will not be described.

The PC 2 includes a wireless LAN (WLAN) communication module 112, a Bluetooth (BT) communication module 113, a CPU 115, a memory 116, an input unit 117, and a display unit 118. The components of the PC 2 are connected through a bus 122.

The wireless LAN (WLAN) communication module 112 performs wireless LAN communication compliant with a predetermined standard, such as IEEE 802.11a/b/g, through an embedded antenna (not shown).

The Bluetooth (BT) communication module 113 wirelessly communicates with other communication devices existing in proximity (e.g., several to ten-odd meters) to the PC 2 through an embedded antenna.

The CPU 115 generates various control signals and supplies the signals to control the components of the PC 2. The CPU 115 executes various processes in accordance with programs stored in a ROM or various application programs or control programs including an operation system loaded from the ROM to a RAM.

The memory 116 is a storage device, such as a ROM, a RAM, a flash memory device, and an HDD.

The input unit 117 receives input through an input unit, such as a keyboard and a mouse, and transfers the input signal to the CPU 115. The display unit 118 displays data including characters, images, etc. under the control of the CPU 115. The display unit 118 is constituted by, for example, an LCD, an organic EL display, and an inorganic EL display.

Figure 8:
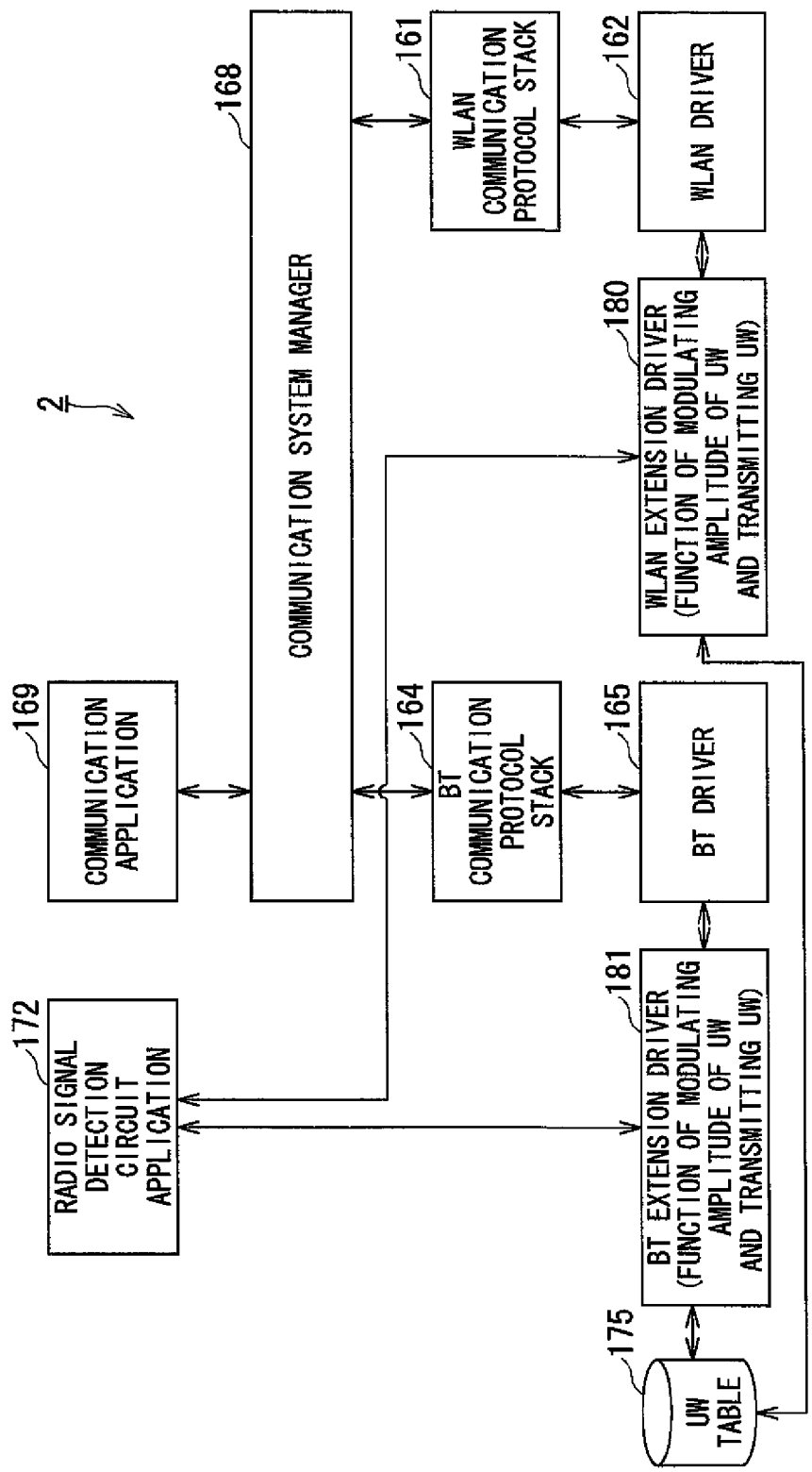
FIG. 8 is a software system block diagram of a PC.

FIG. 8 is a software system block diagram of the PC 2. A configuration for realizing wireless communication with the cell phone 1 will be mainly described for the PC 2 in the present embodiment, and details of a software system configuration generally included in PCs will not be described.

A WLAN communication protocol stack 161 executes a predetermined WLAN communication procedure. A wireless LAN (WLAN) driver 162 controls the WLAN communication module 112 to perform a procedure executed by the WLAN communication protocol stack 161. A wireless LAN (WLAN) extension driver 180 is a driver that modulates the amplitude of UWs and commands stored in a UW table 175 and that transmits the UWs and the commands from the WLAN communication module 112. The WLAN extension driver 180 modulates the amplitude of the UWs and the commands once or a plurality of times immediately after the activation depending on activation parameters of the WLAN communication module 112 and transmits the UWs and the commands from the WLAN communication module 112.

A Bluetooth (BT) communication protocol stack 164 executes a predetermined BT communication procedure. A Bluetooth (BT) driver 165 controls the BT communication module 113 to perform the procedure executed by the BT communication protocol stack 164. A Bluetooth (BT) extension driver 181 is a driver that modulates the amplitude of the UWs and the commands stored in the UW table 175 and that transmits the UW and the commands from the BT communication module 113 as each of UW signals. The BT extension driver 181 modulates the amplitude of the UWs and the commands once or a plurality of times immediately after the activation depending on activation parameters of the BT communication module 113 and transmits the UWs and the commands from the BT communication module 113.

A communication system manager 168 manages the WLAN communication protocol stack 161 and the BT communication protocol stack 164. A communication application 169 directly receives, for example, a communication instruction from the user and notifies the communication system manager 168 of the instruction.

A radio signal detection circuit application 172 receives, for example, a UW registration instruction and input data from the user and notifies the WLAN extension driver 180 and the BT extension driver 181 of the instruction and the data. The unique word (UW) table 175 stores UWs set by the user and so on. During UW signal transmission, any command and UW read out from the UW table 175 are sent out based on an instruction from the user received by the radio signal detection circuit application 172 or based on the determination of the application.

Here, three systems are conceivable as a system in which the PC 2 utilizes the WLAN communication module 112 to transmit radio waves. The first transmission system is a system in which the PC 2 changes a mode of the WLAN communication module 112 into an AP mode to transmit a Beacon signal by using the WLAN communication module 112. The second transmission system is a system in which the PC 2 changes the mode of the WLAN communication module 112 into an Adhoc mode and operates as a master in the Adhoc mode to transmit a Beacon signal by using the WLAN communication module 112. Further, the third transmission system is a system in which the PC 2 changes the mode of the WLAN communication module 112 into an STA mode (STATION mode; in other words, terminal mode) and sets a scanning system in the STA mode to Active Scan to transmit a Probe Request signal by using the WLAN communication module 112. Moreover, the "Beacon signal" and the "Probe Request signal" are signals containing a predetermined management frame and correspond to WLAN signals at the time of WLAN communication.

In addition, the "AP mode" is a mode in which the information processing apparatuses each including the WLAN communication module communicate with each other via the AP (access point) 7 for the WLAN. The "Adhoc mode" is a mode in which the information processing apparatuses each including the WLAN communication module communicate directly with each other without intermediation of the AP 7 for the WLAN. The "STA mode" is a mode for connecting the information processing apparatus to the AP 7 for the WLAN or another information processing apparatus, and has two scanning systems, that is, Active Scan and Passive Scan. In the case of the Passive Scan in the STA mode, the information processing apparatus receives a Beacon signal which is broadcast from the AP 7 to a communication possible area to check SSIDs (Service Set Identifiers) with the AP 7. The information processing apparatus makes the transition to an authentication phase with the AP 7. In the case of the Active Scan in the STA mode, if the Beacon signal cannot be received from the AP 7 for a given period of time, the information processing apparatus transmits a Probe Request signal containing information on the SSID of the AP 7 with which communication is requested. When the information processing apparatus can obtain a Probe Response signal from the AP 7, the information processing apparatus makes the transition to the authentication phase with the AP 7. Incidentally, the "Adhoc mode" has two cases, that is, a case of operating as a master in the Adhoc mode and a case of operating as a slave in the Adhoc mode. In the case of operating as the slave in the Adhoc mode, there are two scanning systems, that is, the Active Scan and the Passive Scan as in the above description of the STA mode.

In the case where it is determined that communication using the AP (access point) 7, which has a higher priority than communication in which the cell phone 1 operates as a modem, can be utilized, the PC 2 uses the utilizable AP 7 to perform the communication. However, in the case where the PC 2 determines as a result of WiFi AP search that there is no utilizable AP 7, conventionally, there has been no procedure definition as to how the PC 2 connects to the server 6 or another information processing apparatus.

Figure 9:
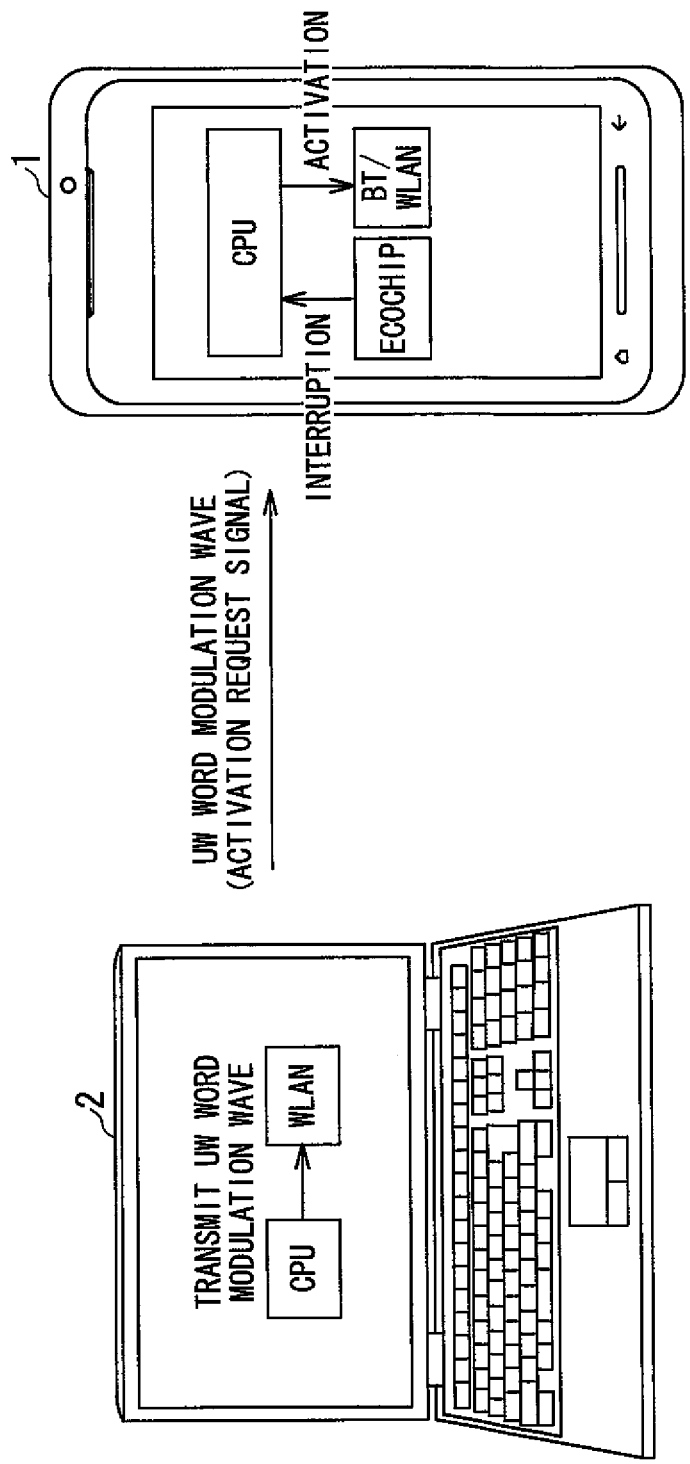
FIG. 9 is a conceptual view for describing an embodiment of the present invention.

FIG. 9 is a conceptual view for describing the embodiment of the present invention. As illustrated in FIG. 9, in the case where the PC 2 determines as the result of the WiFi AP search that there is no utilizable AP 7, in an automatic manner or when a user desires to utilize the cell phone 1 as an AP (wireless base station), the PC 2 generates an activation request signal for requesting the activation of a WLAN communication module 12 included in the cell phone 1 to transmit the generated signal to the EcoChip included in the cell phone 1. Here, a signal used as the activation request signal for requesting the activation of the WLAN communication module 12 included in the cell phone 1 is the "Beacon signal", the "Probe Request signal", and the like, and corresponds to the WLAN signal or a UW signal (unique word modulation wave). Incidentally, the UW signal is identification information used for identifying the PC 2 and also is a signal obtained by adding, to the WLAN signal, unique word information set between the PC 2 and the cell phone 1. The EcoChip included in the cell phone 1 detects the activation request signal from the PC 2, generates an interrupt signal for causing an interrupt in a CPU 15 included, and outputs the generated signal to the CPU 15. In response to the interrupt signal from the EcoChip, the CPU 15 activates the WLAN communication module 12. The cell phone 1 establishes connection with the PC 2 via the WLAN communication module 12.

However, in the conventional WiFi communication system, a de facto transmission period of a Beacon signal of the AP 7 is a period of approximately 100 ms (for example, period of 102.4 ms). Hence, both a transmission period of the first transmission system and a transmission period of the second transmission system are generally the de facto transmission period of 102.4 ms. Therefore, it is difficult for the cell phone 1 which communicates with the PC 2 by using the WLAN communication module to distinguish a normal Beacon signal from the AP 7 and a Beacon signal (activation request signal) from the PC 2. In addition, a transmission period of the third transmission system in which the PC 2 changes the mode of the WLAN communication module 112 into the STA mode and sets the scanning system in the STA mode to the Active Scan to transmit the Probe Request signal is basically the same as the de facto transmission period (period of 102.4 ms) of the Beacon signal of the AP, which is similar to the first transmission system and the second transmission system.

In particular, the PC 2 scans every WiFi channel for each predetermined search period (repetition period), and for the purpose of electric power saving, the PC 2 remains in a sleep state until the next search is performed and intermittently wakes up for each search period (this series of operations is referred to as "intermittent operation").

Figure 10:
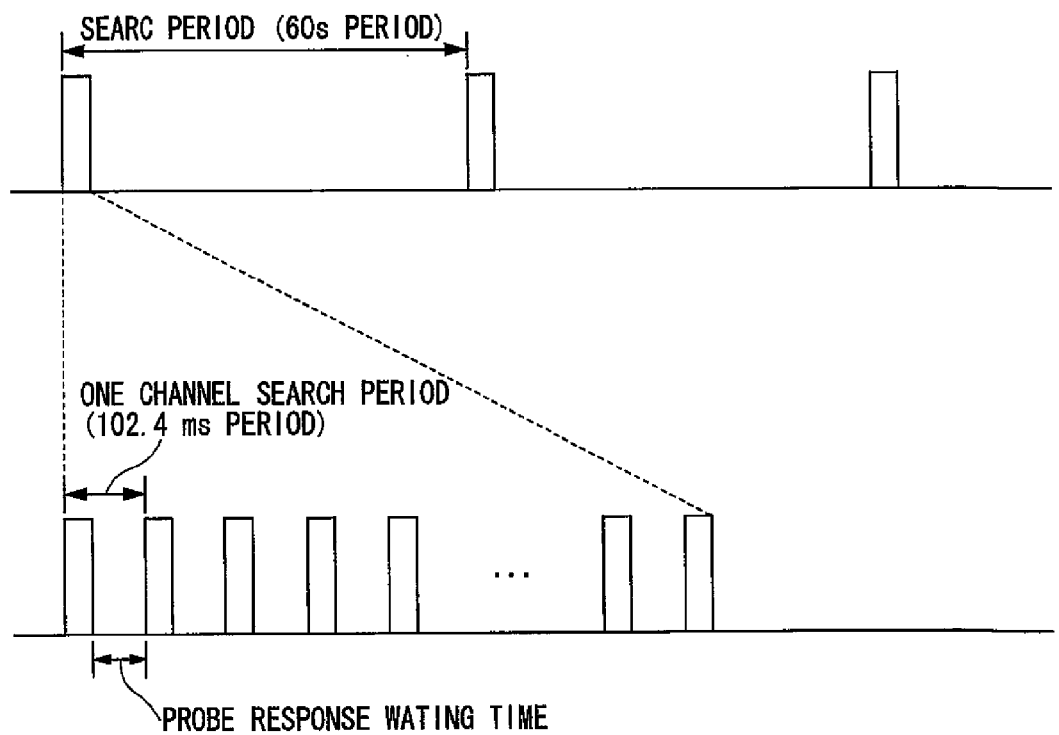
FIG. 10 is an explanatory diagram for describing an operation of Active Scan in a conventional STA mode performed by a PC.

FIG. 10 is an explanatory diagram for describing an operation of the Active Scan in a conventional STA mode performed by the PC 2.

As illustrated in FIG. 10, in the Active Scan, in one AP search, the PC 2 sends out the Probe Request signal to the neighboring APs 7 with respect to the utilizable WiFi channels (for example, thirteen channels). This Probe Request signal contains information on the SSID of the AP 7 with which the PC 2 requests to communicate. When the Probe Response signal is sent back to the PC 2 from the AP 7 having the same SSID as the SSID contained in the Probe Request signal, the PC 2 tries to associate with this AP 7. Incidentally, the "Wife channel" refers to a frequency band having a predetermined center frequency and a predetermined frequency bandwidth within a frequency band usable by the WLAN communication module, for example, a frequency band of 2.4 GHz.

At this time, upon the transmission of the Probe Request signal with respect to a given channel, the PC 2 waits for a period of time corresponding to a Probe Response waiting time for receiving the Probe Response signal from the AP 7. When 102.4 ms has elapsed since the transmission of the Probe Request signal with respect to a given channel, the PC 2 performs the AP search on the next channel. After performing the search on all the channels, the WLAN communication module 112 of the PC 2 remains in the sleep state until the next search is performed, in order to reduce power consumption. For example, as illustrated in FIG. 10, the WLAN communication module 112 of the PC 2 remains in the sleep state for a period of time at least in the order of seconds such as 60 seconds.

However, there is a case where the EcoChip included in the cell phone 1 adopts a detection algorithm which requires a certain number of samples due to a narrow bandpass filter and the like. In this case, the number of samples corresponds to the number of WiFi channels (WLAN channels), so that the PC 2 cannot continue to transmit, in a constant period, the number of samples of Probe Request signals which enables the EcoChip to detect the Probe Request signals. Therefore, in the case of the third transmission system, in addition to the difficulty in distinguishing the normal Beacon signal from the AP 7 and the Probe Request signal from the PC 2, the cell phone 1 which communicates with the PC 2 by using the WLAN communication module cannot secure the number of samples of Probe Request signals. This leads to a subject in reception characteristics of the EcoChip included in the cell phone 1.

In view of the above, in the present embodiment, first, in the case where the PC 2 determines as the result of the WiFi AP search that there is no utilizable AP 7, in an automatic manner or when a user desires to utilize the cell phone 1 as an AP, the PC 2 generates the activation request signal for requesting the activation of the WLAN communication module 12 included in the cell phone 1 to transmit the generated signal to the cell phone 1 in a period (for example, period of 60 ms or 70 ms) different from the de facto transmission period (period of 102.4 ms) of the Beacon signal of the AP.

Figure 11:
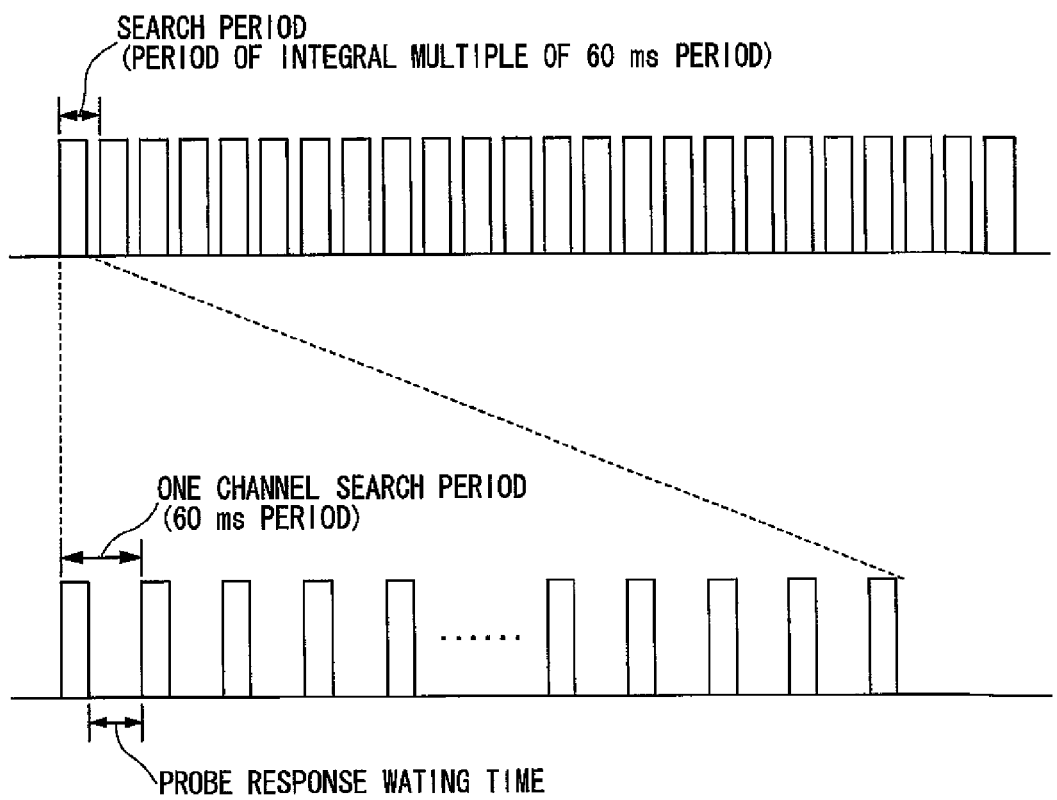
FIG. 11 is an explanatory diagram for describing an operation of Active Scan in STA mode which is performed by PC.

FIG. 11 is an explanatory diagram for describing an operation of the Active Scan in the STA mode which is performed by the PC 2 in the present embodiment.

As illustrated in FIG. 11, in the Active Scan, in one AP search, the PC 2 sends out the Probe Request signal to the neighboring APs 7 with respect to the utilizable WiFi channels (for example, thirteen channels) in a period (for example, period of 60 ms) different from the de facto transmission period (period of 102.4 ms) of the Beacon signal of the AP. As a result, in the case where the PC 2 determines as the result of the WiFi AP search that there is no utilizable AP 7, in an automatic manner or when a user desires to utilize the cell phone 1 as an AP, it is possible to change a transmission period of the activation request signal to be detected by the radio signal detection circuit 21 included in the cell phone 1 into a unique transmission period different from the de facto transmission period (102.4 ms) of the Beacon signal of the AP, which makes it possible to enhance the interference immunity.

Particularly, in the third transmission system in which the PC 2 changes the mode of the WLAN communication module 112 into the STA mode and sets the scanning system in the STA mode to the Active Scan to transmit the Probe Request signal as the activation request signal, the PC 2 not only generates the Probe Request signal to transmit the generated signal to the cell phone 1 in a period different from the de facto transmission period (period of 102.4 ms) of the Beacon signal of the AP, but also, as illustrated in FIG. 11, changes the search period (repetition period) into, for example, a period of the integral multiple of 60 ms which is one channel search period after the change.

As a result, the PC 2 can continue to transmit a transmission waveform as the activation request signal in a constant period, and can transmit the number of samples of activation request signals which is sufficient for the EcoChip (the radio signal detection circuit 21) included in the cell phone 1 which makes a judgment on the basis of only a reception strength on a time axis. Hereinafter, an AP search process using this method is described.

Figure 12:
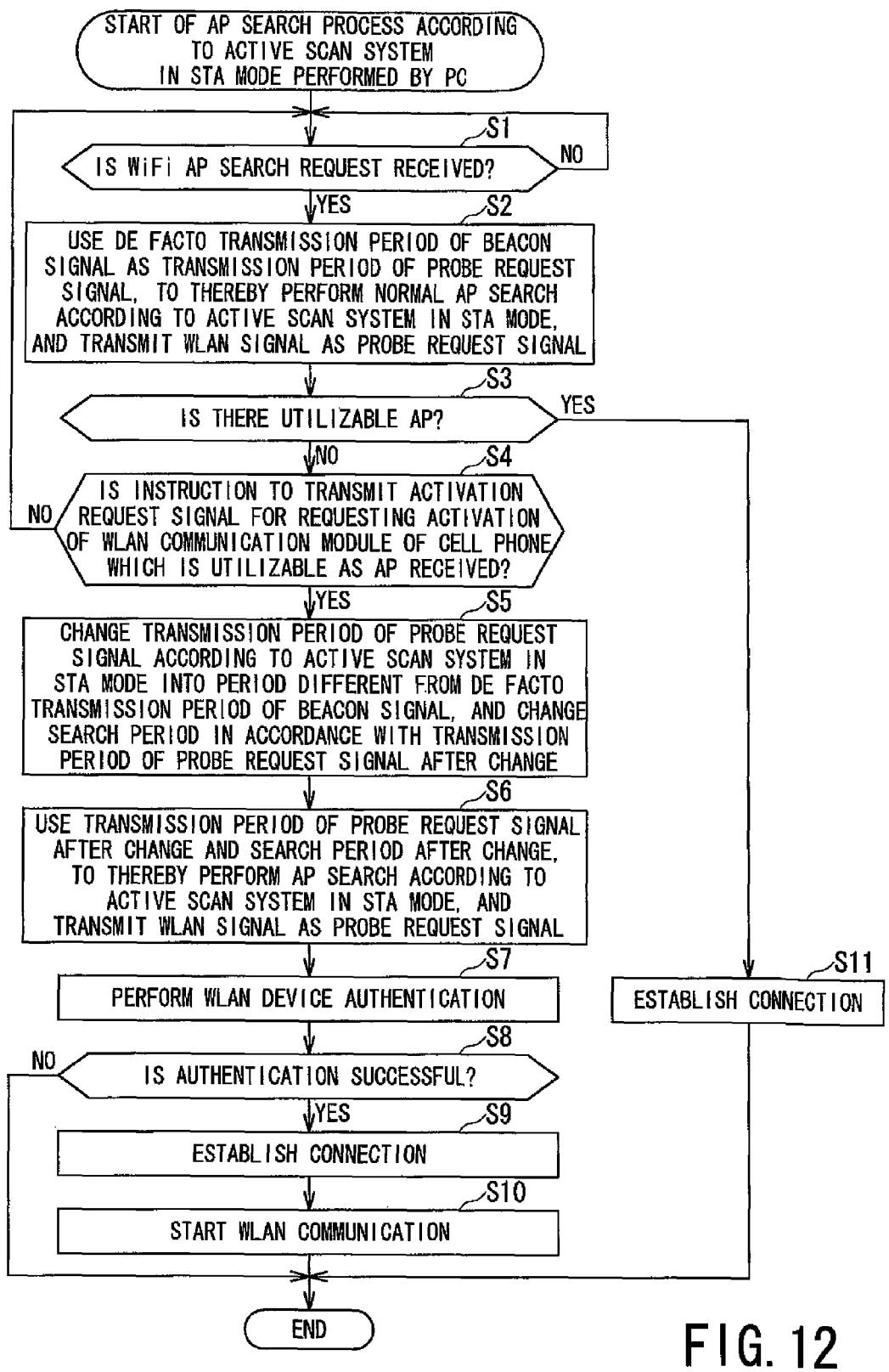
FIG. 12 is a flowchart for describing an AP search process according to an Active Scan system in STA mode which is performed by PC.

With reference to a flowchart of FIG. 12, the AP search process according to the Active Scan system in the STA mode which is performed by the PC 2 is described.

FIG. 12 is a flowchart for describing the AP search process according to the Active Scan system in the STA mode which is performed by the PC 2. Incidentally, in FIG. 12, the PC 2 transmits the WLAN signal as the Probe Request signal according to the Active Scan system in the STA mode to the cell phone 1.

In Step S1, the CPU 115 of the PC 2 determines whether or not the communication application 169 receives a WiFi AP search request (communication request) through the user's operation on the input unit 117. The CPU 115 waits until the CPU 115 determines that the communication application 169 receives the WiFi AP search request. When the CPU 115 of the PC 2 determines in Step S1 that the communication application 169 receives the WiFi AP search request, in Step S2, the CPU 115 of the PC 2 controls the WLAN communication module 112 and uses the de facto transmission period (for example, period of 102.4 ms) of the Beacon signal of the AP as a transmission period of the Probe Request signal, to thereby perform a normal AP search according to the Active Scan system in the STA mode. Specifically, as illustrated in FIG. 10, in one AP search, the PC 2 sends out the WLAN signal as the Probe Request signal to the neighboring APs 7 with respect to the utilizable WiFi channels (for example, thirteen channels). At this time, upon the transmission of the Probe Request signal with respect to a given channel, the PC 2 waits for a period of time corresponding to the Probe Response waiting time which is a waiting time for receiving the Probe Response signal from the AP 7. When 102.4 ms has elapsed since the transmission of the Probe Request signal with respect to a given channel, the PC 2 performs the AP search on the next channel. Incidentally, the Probe Request signal which is transmitted from the PC 2 at this time is defined as a "second identification signal".

In Step S3, the CPU 115 of the PC 2 determines whether or not there is a utilizable AP as the result of the WiFi AP search according to the Active Scan system in the STA mode. If the CPU 115 of the PC 2 determines in Step S3 that there is a utilizable AP, in Step S11, the CPU 115 of the PC 2 establishes connection with the AP determined as utilizable, and communicates with this AP.

On the other hand, if the CPU 115 of the PC 2 determines in Step S3 that there is no utilizable AP, in Step S4, the CPU 115 of the PC 2 determines whether or not an instruction to transmit the activation request signal for requesting the activation of the WLAN communication module 12 of the cell phone 1 which is utilizable as an AP (an ON request of the EcoChip of the cell phone 1) is received through the user's operation on the input unit 117. If the CPU 115 of the PC 2 determines in Step S4 that the instruction to transmit the activation request signal for requesting the activation of the WLAN communication module 12 of the cell phone 1 is not received, the processing returns to Step S1. On the other hand, if the CPU 115 of the PC 2 determines in Step S4 that the instruction to transmit the activation request signal for requesting the activation of the WLAN communication module 12 of the cell phone 1 is received, in Step S5, the CPU 115 of the PC 2 changes the transmission period of the Probe Request signal according to the Active Scan system in the STA mode into a period different from the de facto transmission period (for example, period of 102.4 ms) of the Beacon signal of the AP, and changes the search period depending on the transmission period of the Probe Request signal after the change. Specifically, as illustrated in FIG. 11, in one AP search, the PC 2 changes the transmission period of the Probe Request signal which is transmitted to the neighboring APs 7 and another information processing apparatus with respect to the utilizable WiFi channels (for example, thirteen channels) into a period (for example, period of 60 ms) different from the de facto transmission period (period of 102.4 ms) of the Beacon signal of the AP, and changes the search period into, for example, a period of the integral multiple of 60 ms which is one channel search period after the change (for example, 20 times 60 ms). Incidentally, if the CPU 115 of the PC 2 determines that there is no utilizable AP, the PC 2 may change the transmission period of the Probe Request signal and the search period in an automatic manner without waiting for the instruction from the user. In addition, the PC 2 may change the period into a period other than periods of 60 ms and 70 ms.

The PC 2 changes the transmission period of the Probe Request signal into a period (for example, period of 60 ms or 70 ms) different from the de facto transmission period (period of 102.4 ms) of the Beacon signal of the AP. As a presupposition for adopting this change method, in the conventional WiFi communication system, the de facto transmission period of the Beacon signal of the AP 7 is a period of approximately 100 ms (for example, period of 102.4 ms), and hence it is presupposed that all of the transmission period of the first transmission system in which the PC 2 changes the mode of the WLAN communication module 112 into the AP mode to transmit the Beacon signal, the transmission period of the second transmission system in which the PC 2 changes the mode of the WLAN communication module 112 into the Adhoc mode to transmit the Beacon signal, and the transmission period in which the scanning system in the STA mode is set to the Active Scan to transmit the Probe Request signal are generally the de facto transmission period of 102.4 ms. However, also in a conventional case, there is a case where the transmission period in which the scanning system in the STA mode is set to the Active Scan to transmit the Probe Request signal is set to a transmission period different from the de facto transmission period (period of 102.4 ms) of the Beacon signal of the AP. In such a case, the PC 2 changes the transmission period of the Probe Request signal according to the Active Scan system in the STA mode into a period which is different from the de facto transmission period (period of 102.4 ms) of the Beacon signal of the AP and is also different from the transmission period which is set in a normal operation and in which the scanning system in the STA mode is set to the Active Scan to transmit the Probe Request signal. This enables the cell phone 1 which communicates with the PC 2 by using the WLAN communication module to distinguish the normal Beacon signal from the AP 7 and the Probe Request signal which is transmitted when the scanning system in the STA mode in the normal operation is set to the Active Scan, to thereby identify the Probe Request signal (activation request signal) from the PC 2.

Incidentally, "the transmission period which is set in a normal operation and in which the scanning system in the STA mode is set to the Active Scan to transmit the Probe Request signal" refers to a transmission period in which the scanning system in the STA mode is set to the Active Scan to transmit the Probe Request signal without using the Probe Request signal as the activation request signal for requesting the activation of the WLAN communication module 12 of the cell phone 1.

In Step S6, the CPU 115 of the PC 2 controls the WLAN communication module 112 and uses the transmission period of the Probe Request signal after the change and the search period after the change, to thereby perform the AP search according to the Active Scan system in the STA mode. Specifically, as illustrated in FIG. 11, in one AP search, the PC 2 sends out the WLAN signal as the Probe Request signal to the neighboring APs 7 with respect to the utilizable WiFi channels (for example, thirteen channels). At this time, upon the transmission of the Probe Request signal with respect to a given channel, the PC 2 waits for a period of time corresponding to the Probe Response waiting time which is a waiting time for receiving the Probe Response signal from the AP 7. When 60 ms has elapsed since the transmission of the Probe Request signal with respect to a given channel, the PC 2 performs the AP search on the next channel. The search period at this time is, for example, a period of 20 times 60 ms. This makes it possible to transmit the Probe Request signal as the WLAN signal to the cell phone 1 by using a transmission period (for example, period of 60 ms) different from the transmission period of the Probe Request signal which is used in the normal AP search according to the Active Scan system in the STA mode. As a result, a probability that the EcoChip of the cell phone 1 erroneously detects the WLAN signal from the PC 2 can be made extremely small.

Incidentally, the Probe Request signal according to the Active Scan system in the STA mode, which is transmitted from the PC 2 in Step S6, is defined as a "first identification signal".

In Step S7, the CPU 115 of the PC 2 controls the WLAN communication module 112 and performs device authentication for establishing the WLAN communication with the cell phone 1. That is, the CPU 115 of the PC 2 controls the WLAN communication module 112 and determines whether or not an SSID contained in the Probe Response signal transmitted from the cell phone 1 and an SSID contained in the Probe Request signal transmitted to the cell phone 1 are identical with each other. If the CPU 115 determines that the SSIDs are identical with each other, the CPU 115 performs the device authentication by using an authentication packet. In Step S8, the CPU 115 of the PC 2 determines whether or not the device authentication with the cell phone 1 is successful. If the CPU 115 of the PC 2 determines in Step S8 that the device authentication is successful, in Step S9, the CPU 115 of the PC 2 exchanges an association request and an association response with the cell phone 1 to perform association, and establishes connection with the cell phone 1. In Step S10, the CPU 115 of the PC 2 starts the WLAN communication with the cell phone 1. This enables the PC 2 to operate the cell phone 1 as an AP and connect to a communication carrier network via a mobile communication module 11 of the cell phone 1.

On the other hand, if the CPU 115 of the PC 2 determines in Step S8 that the device authentication is failed, the processing is ended.

Figure 13:
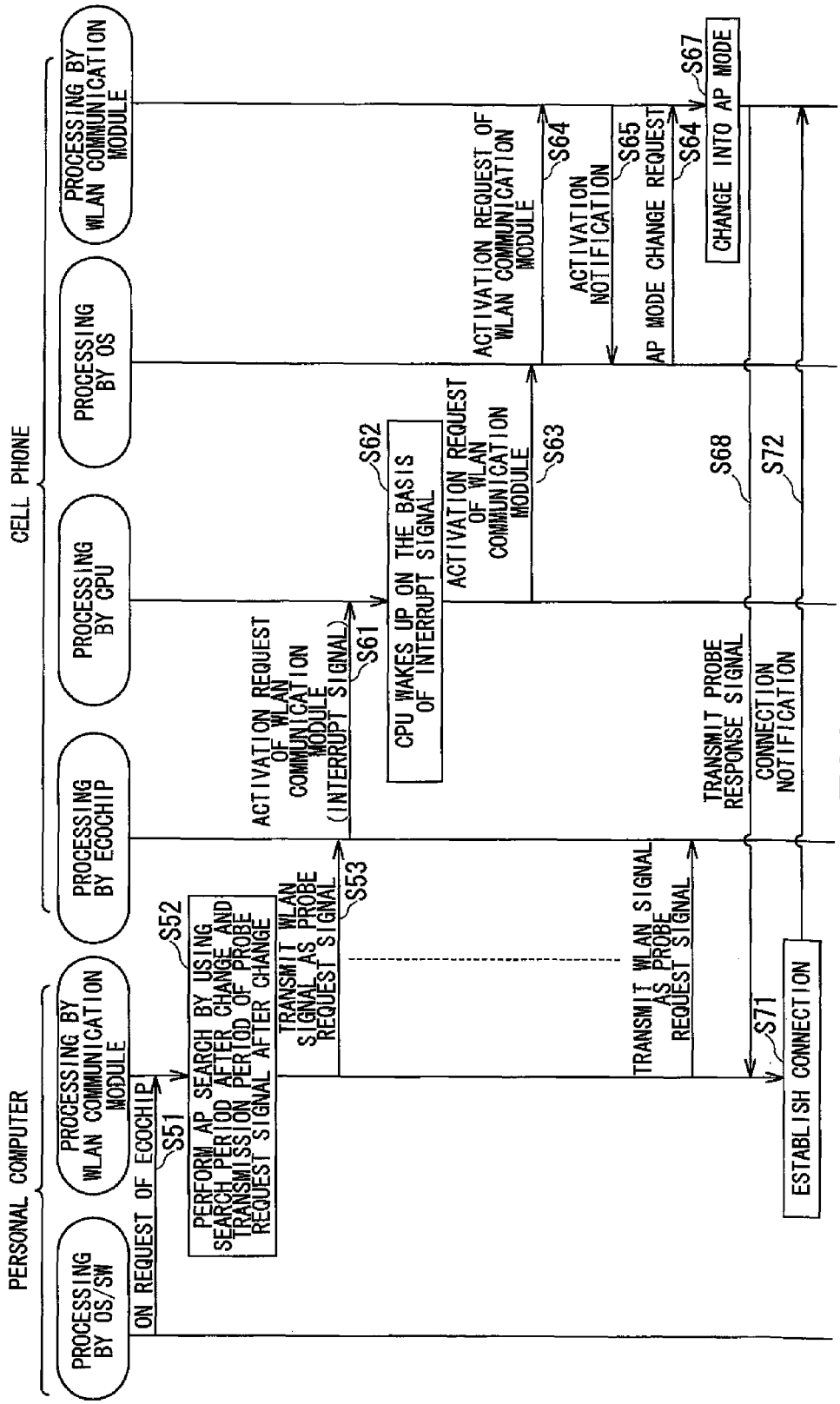
FIG. 13 is a sequence diagram illustrating a wireless communication process between PC which performs an AP search process according to an Active Scan system in STA mode and a cell phone.

FIG. 13 is a sequence diagram illustrating a wireless communication process between the PC 2 which performs the AP search process according to the Active Scan system in the STA mode and the cell phone 1.

FIG. 13 particularly illustrates the processing between the PC 2 and the cell phone 1 which is performed after the CPU 115 of the PC 2 determines in Step S4 of FIG. 12 that the instruction to transmit the activation request signal for requesting the activation of the WLAN communication module 12 of the cell phone 1 which is utilizable as an AP is received.

Incidentally, the radio signal detection circuit 21 included in the EcoChip of the cell phone 1 is in a waiting state for the Probe Request signal as the WLAN signal which is sent out from the PC 2 via the WLAN communication module 112. The WLAN communication module 12 of the cell phone 1 is in an off-state. Further, the CPU 15 of the cell phone 1 performs the intermittent operation and is in the sleep state.

In Step S51, if an OS/SW (software) of the PC 2 determines that the instruction to transmit the activation request signal for requesting the activation of the WLAN communication module 12 of the cell phone 1 which is utilizable as an AP is received through the user's operation on the input unit 117, the OS/SW (software) of the PC 2 notifies the WLAN communication module 112 of the ON request of the EcoChip of the cell phone 1. At this time, the OS/SW (software) of the PC 2 changes the transmission period of the Probe Request signal according to the Active Scan system in the STA mode into a period different from the de facto transmission period (for example, period of 102.4 ms) of the Beacon signal of the AP, and changes the search period in depending on the transmission period of the Probe Request signal after the change.

In Step S52, depending on the OS/SW control performed by the CPU 115 of the PC 2, the WLAN communication module 112 uses the transmission period of the Probe Request signal after the change and the search period after the change to perform the AP search according to the Active Scan system in the STA mode.

As illustrated in FIG. 11, the PC 2 sends out the WLAN signal as the Probe Request signal to the neighboring APs 7 and another information processing apparatus with respect to the utilizable WiFi channels (for example, thirteen channels) (Step S53 of FIG. 13). At this time, upon the transmission of the Probe Request signal with respect to a given channel, the PC 2 waits for a period of time corresponding to the Probe Response waiting time which is a waiting time for receiving the Probe Response signal from the AP 7. When 60 ms has elapsed since the transmission of the Probe Request signal with respect to a given channel, the PC 2 performs the AP search on the next channel. The search period at this time is, for example, a period of 20 times 60 ms. As described later, the PC 2 continues to transmit the Probe Request signal to the cell phone 1 until the PC 2 receives the Probe Response signal from the cell phone 1.

In Step S61, the radio signal detection circuit 21 included in the EcoChip of the cell phone 1 determines whether or not the WLAN signal sent out from the PC 2 is detected. Specifically, the radio signal detection circuit 21 determines whether or not the WLAN signal is detected from a specific pattern outputted to a WLAN signal detection circuit 43 of the radio signal detection circuit 21. If the WLAN signal is detected, a control signal output circuit 35 outputs a control signal to the interrupt signal generation circuit 14. The interrupt signal generation circuit 14 generates an interrupt signal to output the generated signal to the CPU 15. If it is determined that the WLAN signal is not detected, the cell phone 1 waits until the WLAN signal is detected. Incidentally, the interrupt signal serves as an activation request of the WLAN communication module 12 of the cell phone 1.

If the WLAN signal is detected and the CPU 15 receives the interrupt signal, in Step S62, the CPU 15 of the cell phone 1 wakes up on the basis of the interrupt signal. Then, the CPU 15 of the cell phone 1 reads an interruption factor on the basis of signals from the WLAN signal detection signal generation circuit 45, the BT signal detection signal generation circuit 46, or the comparators 52. Here, the CPU 15 of the cell phone 1 recognizes that the interrupt signal is generated due to the detection of the WLAN signal by the radio signal detection circuit 21 and an interrupt process is the activation of the WLAN communication module 12. In Step S63, the CPU 15 of the cell phone 1 notifies an OS of the cell phone 1, of the activation request of the WLAN communication module 12.

In Step S64, in order to activate the WLAN communication module 12, the OS of the cell phone 1 notifies the WLAN communication module 12 of the activation request. In Step S65, the WLAN communication module 12 of the cell phone 1 is activated depending on the activation request of the WLAN communication module 12 from the OS of the cell phone 1, and returns to the OS an activation notification to the effect that the WLAN communication module 12 is activated. In Step S66, the OS of the cell phone 1 notifies the WLAN communication module 12 of an AP change request for changing the mode of the WLAN communication module 12 into the AP mode. In Step S67, depending on the AP change request from the OS, the WLAN communication module 12 changes the mode thereof into the AP mode. In Step S68, the WLAN communication module 12 transmits to the PC 2 the Probe Response signal which is the response to the Probe Request signal. At this time, the transmission of the Probe Response signal by the cell phone 1 is performed as a result of the reception by the WLAN communication module 12, of the Probe Request signal which is transmitted from the PC 2 in Step S53 (the Probe Request signal which is transmitted in a transmission period different from the de facto transmission period of the Beacon signal of the AP described in Step S5 of FIG. 12). In this way, the PC 2 can judge the transmission end of the Probe Request signal on the basis of the Probe Response signal from the cell phone 1. The WLAN communication module 112 of the PC 2 receives the Probe Response signal from the cell phone 1. Then, if the PC 2 determines that the device authentication is successful, the WLAN communication module 112 of the PC 2 exchanges an association request and an association response with the cell phone 1 to perform association, transmits a connection notification to the cell phone 1, and establishes connection with the cell phone 1.

The information processing apparatus (PC 2) according to the present embodiment performs wireless communication with another information processing apparatus (cell phone 1) which is utilizable as a wireless base station by a wireless communication unit (WLAN communication module 112), and uses the wireless communication unit to sequentially transmit in a first transmission period the plurality of second identification signals each having different frequencies within a frequency band usable by the wireless communication unit. The information processing apparatus repeatedly transmits in a second repetition period the second identification signals in the frequency band (or over a substantial entire range of the frequency band), and searches for a wireless base station to which the information processing apparatus can connect (first search method). If there is no wireless base station which is utilizable by the information processing apparatus among the wireless base stations searched for according to the first search method, the information processing apparatus uses the wireless communication unit to sequentially transmit in a second transmission period different from the first transmission period the plurality of first identification signals having different center frequencies within the frequency band usable by the wireless communication unit, as the activation request signal for requesting the activation of a wireless communication unit included in another information processing apparatus. The information processing apparatus repeatedly transmits in a first repetition period the first identification signals in the frequency band (or over a substantial entire range of the frequency band), and can search for another information processing apparatus (second search method). As a result, the PC 2 can establish connection with the cell phone 1 searched for according to the second search method by using the wireless communication unit.

In this way, in the case where the PC 2 determines as the result of the WiFi AP search that there is no utilizable AP 7, in an automatic manner or when a user desires to utilize the cell phone 1 as an AP, it is possible to change the transmission period of the activation request signal to be detected by the radio signal detection circuit 21 included in the cell phone 1 into a unique transmission period different from the de facto transmission period (102.4 ms) of the Beacon signal of the AP. As a result, even if the Beacon signal of the AP and the like mixedly exist in the space at around substantially the same time, only the Probe Request signal from the PC 2 can be identified and detected, which makes it possible to enhance the interference immunity. Accordingly, the PC 2 can prefer-ably establish connection with another information processing apparatus by using the communication module.

In addition, the search period is changed into, for example, a period of the integral multiple of 60 ms which is one channel search period after the change. As a result, the PC 2 can continue to transmit a transmission waveform as the activation request signal in a constant period, and can transmit the number of samples of activation request signals which is sufficient for the EcoChip included in the cell phone 1 which makes a judgment on the basis of only a reception strength on a time axis. Further, in the case where the PC 2 transmits the WLAN signal as the Probe Request signal according to the Active Scan system in the STA mode to the cell phone 1 as illustrated in FIG. 12, unlike the Adhoc mode and the AP mode to be described later, it is not necessary to switch the modes of the WLAN modules in the PC 2 and the cell phone 1. Therefore, it is possible to simplify the sequence between both of the terminals and to make as short as possible the delay time in an entire service in which the cell phone 1 is utilized as an AP.

In addition, in the example of FIG. 12, the PC 2 transmits the WLAN signal as the Probe Request signal according to the Active Scan system in the STA mode to the cell phone 1, but the above-mentioned operation can also be applied in another operation mode having a search process of the WLAN (for example, the Adhoc mode). Therefore, it is possible to perform a similar EcoChip activation signal transmission in a search operation in the Adhoc mode, for example. That is, the PC 2 operates as a slave in the Adhoc mode, and transmits the WLAN signal as the Probe Request signal according to the Active Scan system in the Adhoc mode to the cell phone 1, to thereby make it possible to perform the similar EcoChip activation signal transmission. The AP search process performed in this case is illustrated in FIG. 14.

Figure 14:
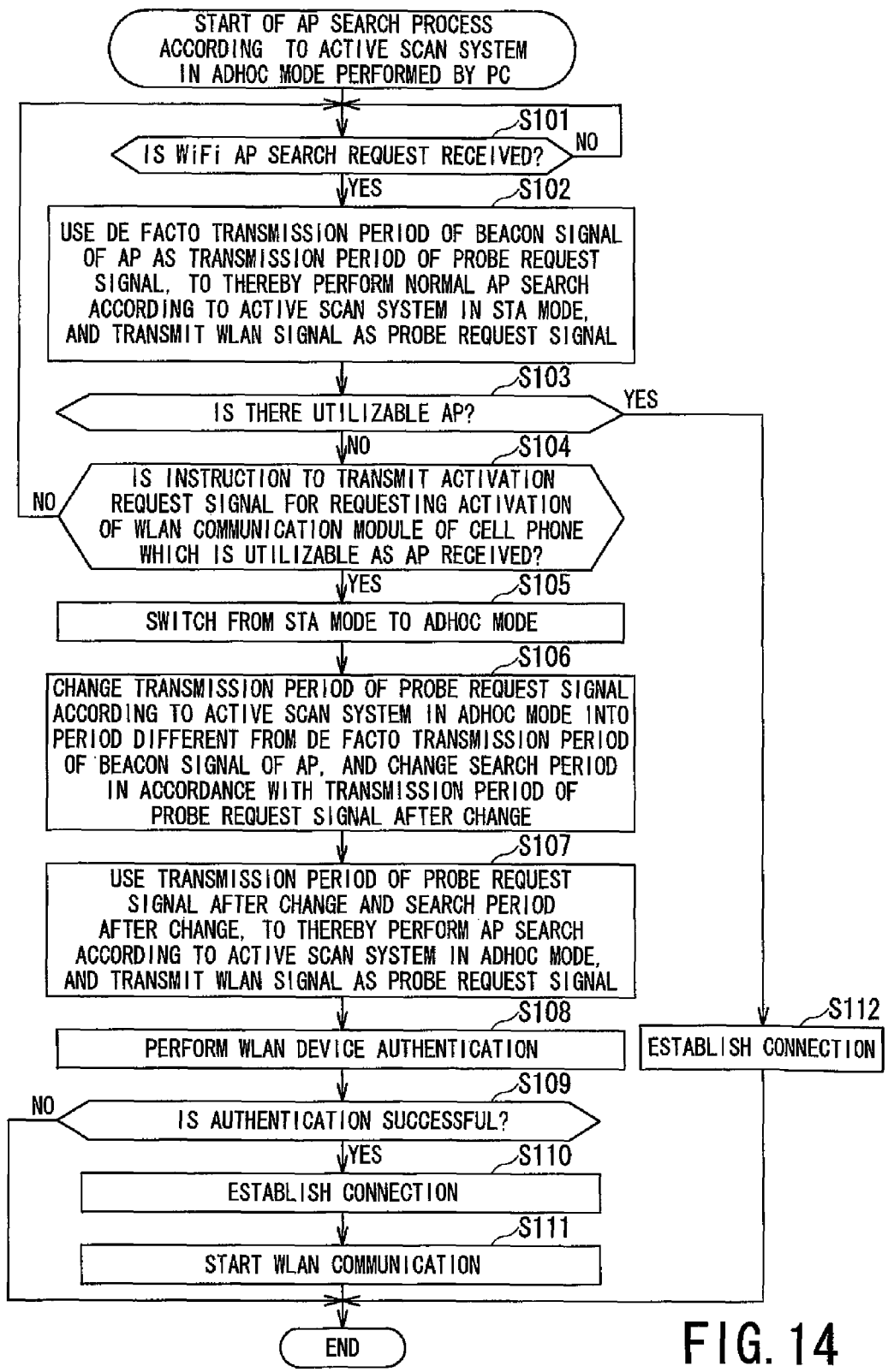
FIG. 14 is a flowchart for describing an AP search process according to an Active Scan system in Adhoc mode which is performed by PC.

FIG. 14 is a flowchart for describing the AP search process according to the Active Scan system in the Adhoc mode which is performed by the PC 2. The AP search process of FIG. 14 is basically the same as the AP search process of FIG. 12. However, in the example of FIG. 14, in Step S105, the CPU 115 of the PC 2 controls the WLAN communication module 112 and switches the mode of the WLAN communication module 112 from the STA mode to the Adhoc mode, and the PC 2 operates as a slave in the Adhoc mode. Then, the PC 2 transmits the WLAN signal as the Probe Request signal according to the Active Scan system in the Adhoc mode to the cell phone 1.

In the examples of FIG. 12 to FIG. 14, a signal used as the activation request signal for requesting the activation of the WLAN communication module 12 included in the cell phone 1 is the "Probe Request signal" according to the Active Scan system in the STA mode or the Adhoc mode, but the "Beacon signal" may be used as the activation request signal for requesting the activation of the WLAN communication module 12 included in the cell phone 1.

Figure 15:
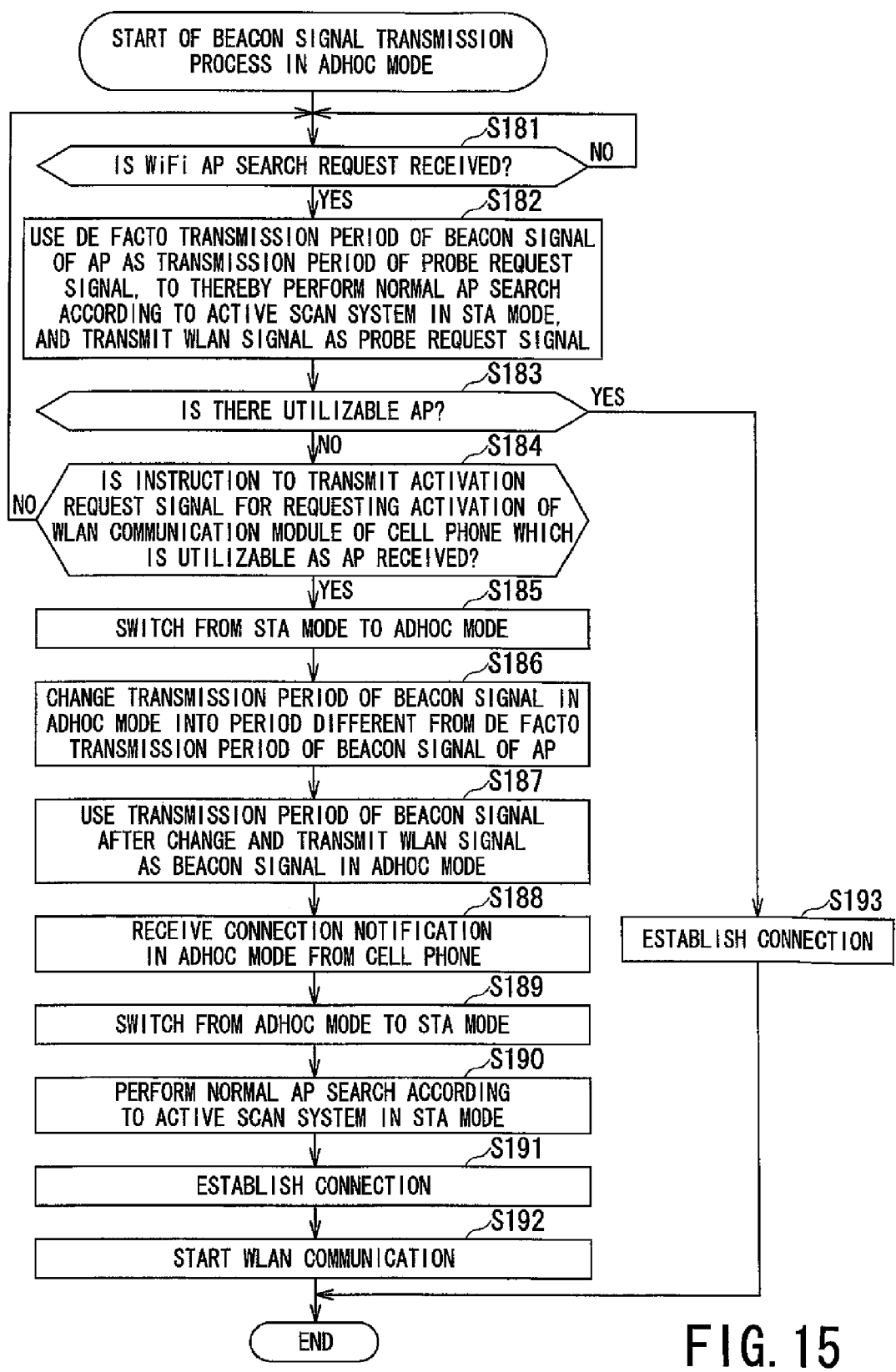
FIG. 15 is a flowchart for describing a Beacon signal transmission process in Adhoc mode which is performed by PC.

FIG. 15 is a flowchart for describing a Beacon signal transmission process in the Adhoc mode which is performed by the PC 2.

In the example of FIG. 15, the PC 2 transmits the WLAN signal as the Probe Request signal according to the Active Scan system in the STA mode to the cell phone 1 to perform the normal AP search. Then, the PC 2 switches the mode of the WLAN communication module from the STA mode to the Adhoc mode, operates as a master in the Adhoc mode, and transmits the WLAN signal as the Beacon signal in the Adhoc mode (Adhoc Beacon signal) to the cell phone 1.

In Step S181, the CPU 115 of the PC 2 determines whether or not the communication application 169 receives the WiFi AP search request (communication request) through the user's operation on the input unit 117. The CPU 115 waits until the CPU 115 determines that the communication application 169 receives the WiFi AP search request. When the CPU 115 determines in Step S181 that the communication application 169 receives the WiFi AP search request, in Step S182, the CPU 115 controls the WLAN communication module 112 and uses the de facto transmission period (for example, period of 102.4 ms) of the Beacon signal of the AP as the transmission period of the Probe Request signal, to thereby perform the normal AP search according to the Active Scan system in the STA mode. The specific processing is the same as the processing in Step S2 of FIG. 12.

In Step S183, the CPU 115 determines whether or not there is a utilizable AP as the result of the WiFi AP search according to the Active Scan system in the STA mode. If the CPU 115 determines in Step S183 that there is a utilizable AP, in Step S193, the CPU establishes connection with the AP determined as utilizable, and communicates with this AP.

On the other hand, if the CPU 115 determines in Step S183 that there is no utilizable AP, in Step S184, the CPU 115 determines whether or not an instruction to transmit the activation request signal for requesting the activation of the WLAN communication module 12 of the cell phone 1 which is utilizable as an AP (the ON request of the EcoChip of the cell phone 1) is received through the user's operation on the input unit 117. If the CPU 115 determines in Step S184 that the instruction to transmit the activation request signal for requesting the activation of the WLAN communication module 12 is not received, the processing returns to Step S181. On the other hand, if the CPU 115 determines in Step S184 that the instruction to transmit the activation request signal is received, in Step S185, the CPU 115 controls the WLAN communication module 112 and switches the mode of the WLAN communication module 112 from the STA mode to the Adhoc mode. The PC 2 starts to operate as a master in the Adhoc mode. In Step S186, the CPU 115 changes the transmission period of the Adhoc Beacon signal in the Adhoc mode into a period different from the de facto transmission period (for example, period of 102.4 ms) of the Beacon signal of the AP. Specifically, the PC 2 changes the transmission period of the Adhoc Beacon signal into a period (for example, period of 60 ms) different from the de facto transmission period (period of 102.4 ms) of the Beacon signal of the AP. Incidentally, if the CPU 115 determines that there is no utilizable AP, the PC 2 may switch the mode of the WLAN communication module 112 from the STA mode to the Adhoc mode without waiting for the instruction from the user, and then may change the transmission period of the Adhoc Beacon signal in an automatic manner. Similarly to Step S6 of FIG. 12, in consideration of the case where the transmission period in which the scanning system in the STA mode is set to the Active Scan to transmit the Probe Request signal is set to a transmission period different from the de facto transmission period (period of 102.4 ms) of the Beacon signal of the AP, the PC 2 may change the transmission period of the Adhoc Beacon signal into a period which is different from the de facto transmission period (period of 102.4 ms) of the Beacon signal of the AP and is also different from the transmission period which is set in a normal operation and in which the scanning system in the STA mode is set to the Active Scan to transmit the Probe Request signal.

In Step S187, the CPU 115 controls the WLAN communication module 112 and uses the transmission period of the Adhoc Beacon signal after the change, to thereby perform a transmission process of the Adhoc Beacon signal in the Adhoc mode. Incidentally, the Adhoc Beacon signal transmitted from the PC 2 is transmitted as the Beacon signal having a particular channel depending on settings made in advance or as a result of carrier sensing. At this time, the Adhoc Beacon signal in the Adhoc mode which is transmitted from the PC 2 in Step S187 is also defined as the "second identification signal". In this way, it is possible to transmit the Adhoc Beacon signal in the Adhoc mode as the WLAN signal to the cell phone 1 by using a transmission period (for example, period of 60 ms) different from the transmission period in the Adhoc mode which is used at the time of the transmission of the normal Adhoc Beacon signal in the Adhoc mode. As a result, a probability that the EcoChip of the cell phone 1 erroneously detects the WLAN signal from the PC 2 can be made extremely small.

In Step S188, the WLAN communication module 112 receives a connection notification in the Adhoc mode from the cell phone 1. The CPU 115 recognizes that the connection with the cell phone 1 is established in the Adhoc mode. In Step S189, the CPU 115 controls the WLAN communication module 112 and switches the mode of the WLAN communication module 112 from the Adhoc mode to the STA mode. At this time, the personal computer 2 receives the Beacon signal from the cell phone 1. This Beacon signal from the cell phone 1 contains information on the SSID of the cell phone 1 with which the PC 2 requests to communicate. In Step S190, the CPU 115 controls the WLAN communication module 112, performs the normal AP search according to the Passive Scan system in the STA mode, and checks with the cell phone 1 whether or not the SSIDs thereof are identical with each other. In Step S191, the CPU 115 exchanges an association request and an association response with the cell phone 1 to perform association, and establishes connection with the cell phone 1. In Step S192, the CPU 115 starts the WLAN communication with the cell phone 1. This enables the PC 2 to operate the cell phone 1 as an AP and connect to a communication carrier network via the mobile communication module 11 of the cell phone 1.

Figure 16:
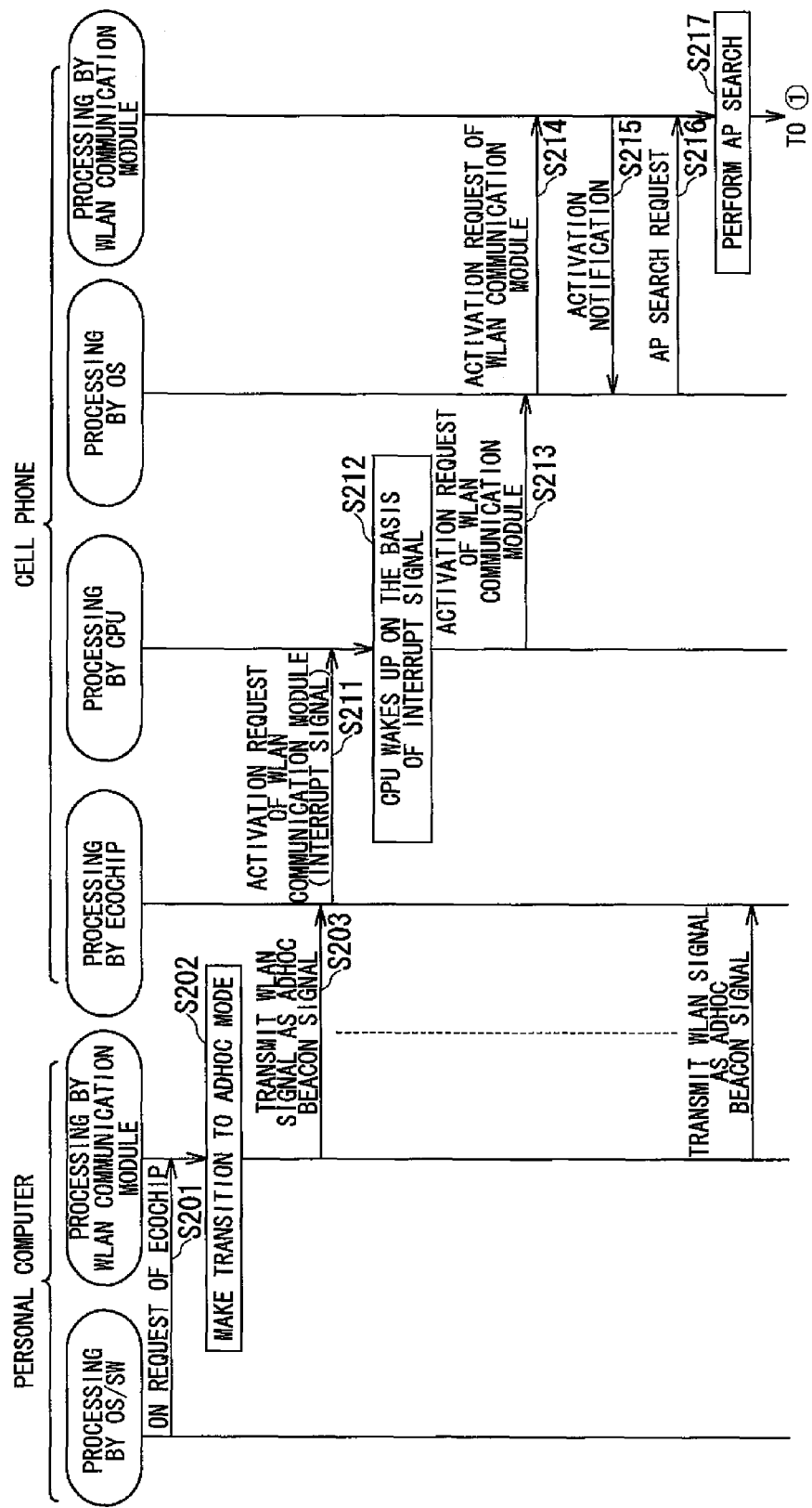
FIG. 16 is a sequence diagram illustrating a wireless communication process between PC which performs a Beacon signal transmission process in Adhoc mode after making transition from STA mode to Adhoc mode and cell phone.

FIG. 16 is a sequence diagram illustrating a wireless communication process between the PC 2 which performs the Beacon signal transmission process in the Adhoc mode after making the transition from the STA mode to the Adhoc mode and the cell phone 1.

Figure 17:
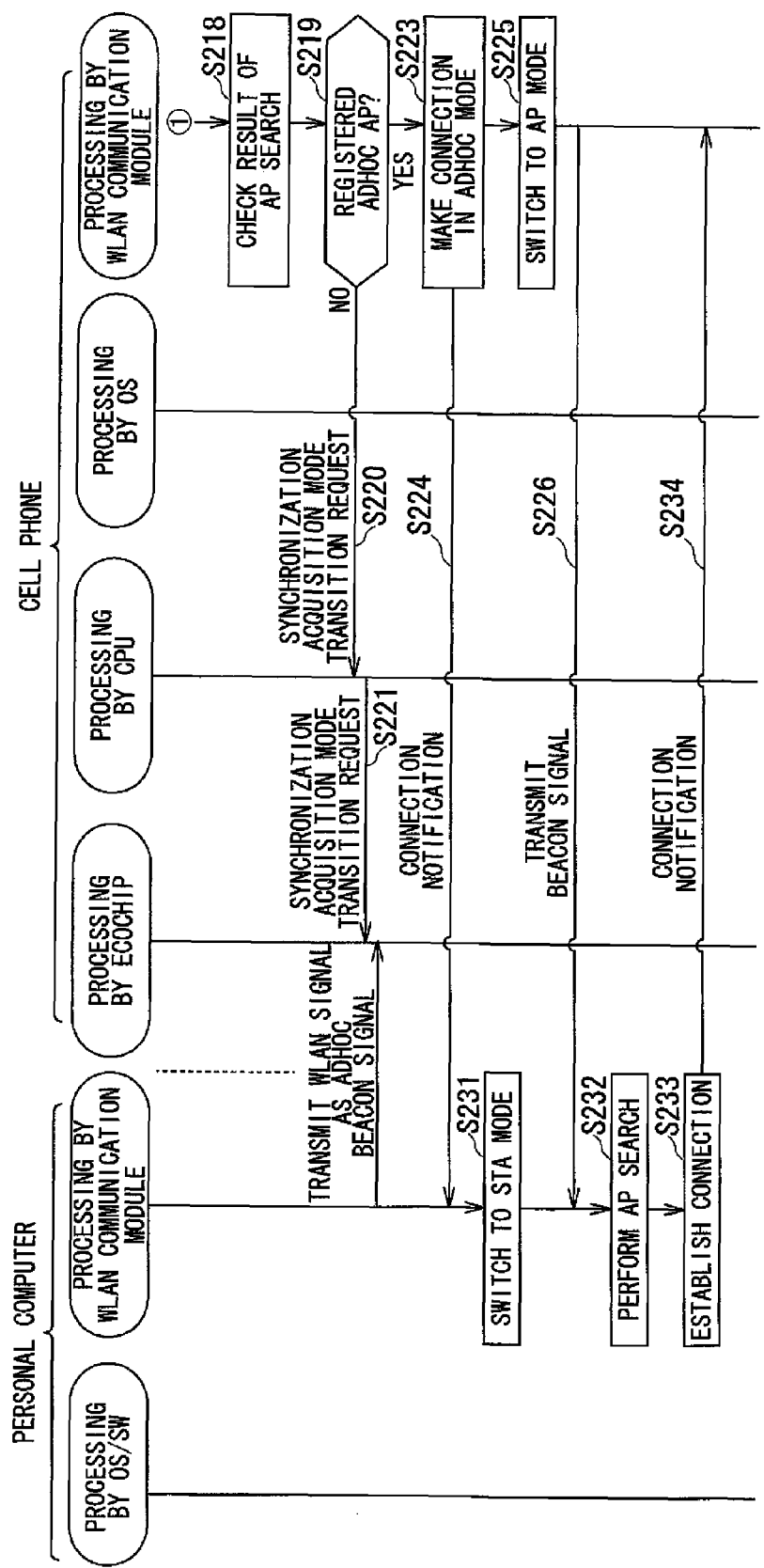
FIG. 17 is a sequence diagram showing a process following FIG. 16.

FIG. 17 is a sequence diagram showing a process following FIG. 16.

FIGS. 16 and 17 particularly illustrate the processing between the PC 2 and the cell phone 1 which is performed after the CPU 115 of the PC 2 determines in Step S184 of FIG. 15 that the instruction to transmit the activation request signal for requesting the activation of the WLAN communication module 12 of the cell phone 1 which is utilizable as an AP (the ON request of the EcoChip of the cell phone 1) is received. Incidentally, the radio signal detection circuit 21 included in the EcoChip of the cell phone 1 is in a waiting state for the Beacon signal (Adhoc Beacon signal) as the WLAN signal which is sent out from the PC 2 via the WLAN communication module 112. The WLAN communication module 12 of the cell phone 1 is in an off-state. Further, the CPU 15 of the cell phone 1 performs the intermittent operation and is in the sleep state.

In Step S201, if the OS/SW (software) of the PC 2 determines that the instruction to transmit the activation request signal for requesting the activation of the WLAN communication module 12 of the cell phone 1 which is utilizable as an AP (the ON request of the EcoChip of the cell phone 1) is received through the user's operation on the input unit 117, the OS/SW (software) notifies the WLAN communication module 112 of the ON request of the EcoChip. In Step S202, the OS/SW (software) switches the mode of the WLAN communication module 112 from the STA mode to the Adhoc mode. In addition, the WLAN communication module 112 starts to operate as a master in the Adhoc mode, and changes the transmission period of the Adhoc Beacon signal in the Adhoc mode into a period different from the de facto transmission period (for example, period of 102.4 ms) of the Beacon signal of the AP.

In Step S203, depending on the OS/SW control performed by the CPU 115, the WLAN communication module 112 uses the transmission period of the Adhoc Beacon signal after the change to perform the transmission process of the Adhoc Beacon signal in the Adhoc mode. The PC 2 sends out the WLAN signal as the Adhoc Beacon signal to other neighboring information processing apparatuses with respect to a particular channel of the utilizable WiFi channels (for example, thirteen channels).

In Step S211, the radio signal detection circuit 21 included in the EcoChip of the cell phone 1 determines whether or not the WLAN signal sent out from the PC 2 is detected. Specifically, the radio signal detection circuit 21 determines whether or not the WLAN signal is detected from a specific pattern outputted to the WLAN signal detection circuit 43 of the radio signal detection circuit 21. If the WLAN signal is detected, the control signal output circuit 35 outputs a control signal to the interrupt signal generation circuit 14. The interrupt signal generation circuit 14 generates an interrupt signal to output the generated signal to the CPU 15. If it is determined that the WLAN signal is not detected, the cell phone 1 waits until the WLAN signal is detected. Incidentally, the interrupt signal serves as the activation request of the WLAN communication module 12 of the cell phone 1.

If the WLAN signal is detected and the CPU 15 receives the interrupt signal, in Step S212, the CPU 15 wakes up on the basis of the interrupt signal. Then, the CPU 15 reads an interruption factor on the basis of signals from the WLAN signal detection signal generation circuit 45, the BT signal detection signal generation circuit 46, or the comparators 52. Here, the CPU 15 recognizes that the interrupt signal is generated due to the detection of the WLAN signal by the radio signal detection circuit 21 and an interrupt process is the activation of the WLAN communication module 12. In Step S213, the CPU 15 notifies the OS of the activation request of the WLAN communication module 12.

In Step S214, in order to activate the WLAN communication module 12, the OS notifies the WLAN communication module 12 of the activation request. In Step S215, the WLAN communication module 12 is activated depending on the activation request of the WLAN communication module 12 from the OS, and returns to the OS an activation notification to the effect that the WLAN communication module 12 is activated. At this time, the mode of the WLAN communication module 12 is the Adhoc mode. In Step S216, the OS notifies the WLAN communication module 12 of an AP search request for requesting the AP search in the Adhoc mode. In Step S217, depending on the AP search request (the request of the AP search in the Adhoc mode) from the OS, the WLAN communication module 12 performs the AP search according to the Active Scan system in the Adhoc mode. In Step S218 of FIG. 17, the CPU 15 controls the WLAN communication module 12 and checks a result of the AP search according to the Active Scan system in the Adhoc mode. In Step S219, the CPU 15 determines on the basis of the checking result whether or not the PC 2 is a registered Adhoc AP. If the CPU 15 determines in Step S219 that the PC 2 is a registered Adhoc AP, in Step S223, the CPU 15 controls the WLAN communication module 12 to make connection with the PC 2 in the Adhoc mode, and in Step S224, transmits a connection notification in the Adhoc mode to the PC 2. After that, in Step S225, the CPU 15 switches the mode of the WLAN communication module 12 from the Adhoc mode to the AP mode. Then, in Step S226, the CPU 15 controls the WLAN communication module 12 and transmits the Beacon signal in the AP mode to the PC 2. Identically, if the CPU 15 determines in Step S219 that the PC 2 is not a registered Adhoc AP, the cell phone 1 transmits a synchronization acquisition mode transition request for making the transition to a synchronization acquisition mode to the radio signal detection circuit 21 (Steps S220 and S221).

On the other hand, when the PC 2 receives the connection notification in the Adhoc mode from the cell phone 1, in Step S231, the CPU 115 of the PC 2 switches the mode of the WLAN communication module 112 from the Adhoc mode to the STA mode. When the PC 2 receives the Beacon signal from the cell phone 1, in Step S232, the CPU 115 controls the WLAN communication module 112, performs the normal AP search according to the Passive Scan system in the STA mode, and checks with the cell phone 1 whether or not the SSIDs thereof are identical with each other. In Step S233, the CPU 115 exchanges an association request and an association response with the cell phone 1 to perform association, and establishes connection with the cell phone 1. In Step S234, the CPU 115 of the PC 2 transmits a connection notification to the cell phone 1.

In this way, in the case where the PC 2 determines as the result of the WiFi AP search that there is no utilizable AP 7, in an automatic manner or when a user desires to utilize the cell phone 1 as an AP, it is possible to change the transmission period of the activation request signal (for example, the transmission period of the Adhoc Beacon signal) to be detected by the radio signal detection circuit 21 included in the cell phone 1 into a unique transmission period different from the de facto transmission period (102.4 ms) of the Beacon signal of the AP. As a result, even if the Beacon signal of the AP and the like mixedly exist in the space at around substantially the same time, only the Adhoc Beacon signal from the PC 2 can be identified and detected, which makes it possible to enhance the interference immunity. Accordingly, the PC 2 can preferably establish connection with another information processing apparatus by using the communication module.

In the examples of FIGS. 15, 16, and 17 the PC 2 transmits the WLAN signal as the Adhoc Beacon signal in the Adhoc mode to the cell phone 1, but the above-mentioned operation can also be applied in another operation mode (for example, the AP mode). The Beacon signal transmission process performed in this case is basically the same as the processing of FIG. 15.

In the examples of FIG. 12 to FIG. 17, the PC 2 transmits to the cell phone 1 the WLAN signal as the Probe Request signal according to the Active Scan system in the STA mode or the Adhoc mode, or the Beacon signal in the Adhoc mode or the AP mode (both of the signals are the activation request signal for requesting the activation of the WLAN communication module 12 of the cell phone 1 which is utilizable as an AP). However, the UW signal (unique word modulation wave) and a BT signal may be used instead of the WLAN signal. Also in this case, basic operations are the same. Incidentally, the UW signal is a signal containing information on a UW and a command which are set in advance between the cell phone 1 and the PC 2 (a wireless LAN communication process with the cell phone 1 and the like). The UW signal is amplitude-modulated by a WLAN expansion driver 180 or a BT expansion driver 181, and transmitted by the WLAN communication module 112 or a BT communication module 113.

In addition, in FIG. 12 to FIG. 17, in the case where the PC 2 determines as the result of the WiFi AP search that there is no utilizable AP 7, in an automatic manner or when a user desires to utilize the cell phone 1 as an AP, the PC 2 generates the activation request signal for requesting the activation of the WLAN communication module 12 included in the cell phone 1 to transmit the generated signal to the cell phone 1 in a period (for example, period of 60 ms or 70 ms) different from the de facto transmission period (period of 102.4 ms) of the Beacon signal of the AP, but for example, regardless of the result of the WiFi AP search (regardless of whether or not it is determined that there is no utilizable AP 7), in order to activate a WLAN communication module included in an information processing apparatus other than the cell phone 1, such as a projector, the PC 2 may generate, in an automatic manner or according to a particular operation performed by a user, the activation request signal for requesting the activation of the WLAN communication module (corresponding to the WLAN communication module 12 of FIG. 2) included in the projector to transmit the generated signal to the projector in a period different from the de facto transmission period of the Beacon signal of the AP. Incidentally, the information processing apparatus such as the projector includes the EcoChip (the interrupt signal generation circuit 14 and the radio signal detection circuit 21), the WLAN communication module 12, the CPU 15, and the like which are included in the cell phone 1 of FIG. 2. Here, a case where the projector is provided with a WiFi AP function itself is particularly assumed. A WiFi AP provided in a general household is always powered on, and basically the WiFi AP always monitors an access request from another device to thereby consume an electric power of 100 mA or more. If the WiFi AP provided in the projector is always powered on, the WiFi AP similarly consumes electric power. In view of the above, the PC 2 transmits, to the WiFi AP (WLAN communication module) provided in another information processing apparatus, the activation request signal for requesting the activation of the WLAN communication module included in the projector, which makes it possible to activate, only at the time of utilization thereof, the WiFi AP (WLAN communication module) provided in another information processing apparatus through a simple operation on a button of the PC 2. As a result, the PC 2 can preferably establish connection with another information processing apparatus by using the communication module. In this case, the WiFi AP (WLAN communication module) provided in another information processing apparatus is powered off in a normal operation. Accordingly, because only an EcoChip provided in another information processing apparatus needs to be kept powered on, power consumption in the information processing apparatus such as the projector can preferably be reduced.

Figure 18:
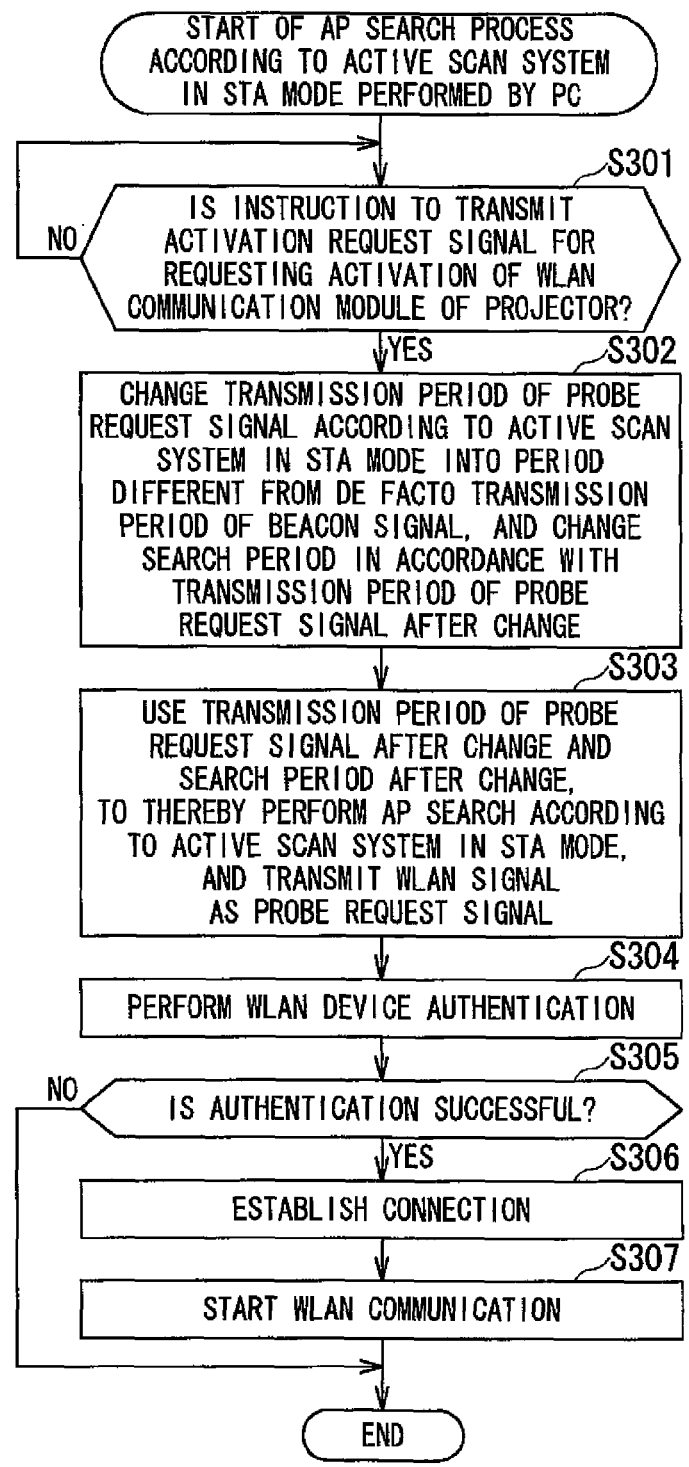
FIG. 18 is a flowchart for describing another AP search process according to an Active Scan system in STA mode which is performed by PC.

The processing performed by the PC 2 in this case is illustrated in FIG. 18.

FIG. 18 is a flowchart for describing another AP search process according to the Active Scan system in the STA mode which is performed by the PC 2. Incidentally, the processing of FIG. 18 is basically the same as the processing in Step S4 and the subsequent steps of FIG. 12, and hence repetitive description thereof is omitted. In addition, the "Beacon signal" in the Adhoc mode or the AP mode may be used as the activation request signal for requesting the activation of the WLAN communication module included in the projector.

An algorithm relating to the processing illustrated in FIG. 12 to FIG. 18 is incorporated in the WLAN communication module 112 itself of the PC 2, and then the processing illustrated in FIG. 12 to FIG. 18 may be performed by the WLAN communication module 112 (the wireless communication device of the present embodiment).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

A series of processes described in the embodiment can be performed not only by software but also by hardware.

In addition, in the embodiment, the steps of each flowchart are described by taking as an example the processes which are chronologically performed in the illustrated order, but the processes are not necessarily performed in chronological order and may be performed in parallel or individually.

What is claimed is:

1. An information processing apparatus comprising:
   a wireless communication unit configured to perform wireless communication with another information processing apparatus which is utilizable as a wireless base station and with an access point, wherein, when communicating with the another information processing apparatus, a plurality of first identification signals repeated with a second transmission period are used, and when communicating with the access point, a plurality of second identification signals repeated with a first transmission period which is different from the second transmission period are used;
   a first search unit configured to:
      use the wireless communication unit to sequentially transmit the plurality of first identification signals each having different center frequencies within a frequency band usable by the wireless communication unit, as an activation request signal for requesting activation of a wireless communication unit included in the another information processing apparatus;
      repeatedly transmit the first identification signals in the frequency band; and
      search for the another information processing apparatus which transmits a response to the first identification signals; and
   a connection unit configured to use the wireless communication unit to establish connection with the another information processing apparatus which is searched for by the first search unit.

2. The information processing apparatus according to claim 1, wherein, when a particular operation is performed, the first search unit uses the wireless communication unit to sequentially transmit the plurality of first identification signals as the activation request signal.

3. The information processing apparatus according to claim 1, further comprising a second search unit configured to:
   use the wireless communication unit to sequentially transmit the plurality of second identification signals each having different center frequencies within the frequency band usable by the wireless communication unit;
   repeatedly transmit the second identification signals in the frequency band; and
   search for the access point which transmits a response to the second identification signals to connect thereto; and when it is determined based on the search by the second search unit that there is no access point utilizable by the information processing apparatus, the first search unit uses the wireless communication unit to sequentially transmit the plurality of first identification signals as the activation request signal, repeatedly transmits the first identification signals in the frequency band, and searches for the another information processing apparatus which transmits the response to the first identification signals.

4. The information processing apparatus according to claim 3, wherein the first identification signals are Probe Request signals which the wireless communication unit sends out when a mode of the wireless communication unit is a first mode, and the second identification signals are the Probe Request signals which the wireless communication unit sends out when the mode of the wireless communication unit is a second mode.

5. The information processing apparatus according to claim 4, wherein:
the wireless communication unit is a WLAN communication module;
the first mode is one of a Station mode and an Adhoc mode according to an Active Scan system relating to the WLAN communication module; and
the second mode is a Station mode relating to the WLAN communication module.

6. The information processing apparatus according to claim 1, wherein the first transmission period is a de facto transmission period of a Beacon signal sent out from the access point.

7. The information processing apparatus according to claim 1, wherein the second transmission period is shorter than the first transmission period.

8. The information processing apparatus according to claim 1, wherein the first identification signals are identification information which is used for identifying the another information processing apparatus and contains unique word information which is set between the information processing apparatus and the another information processing apparatus.

9. The information processing apparatus according to claim 1, wherein, in a case where the first transmission period is a period other than a de facto transmission period of a Beacon signal sent out from the access point, the second transmission period is different not only from the first transmission period but also from the de facto transmission period of the Beacon signal sent out from the access point.

10. An information processing apparatus comprising:
a wireless communication unit configured to perform wireless communication with another information processing apparatus and with an access point, wherein, when communicating with the another information processing apparatus, a plurality of first identification signals repeated with a second transmission period are used, and when communicating with the access point, a plurality of second identification signals repeated with a first transmission period which is different from the second transmission period are used;
a transmission control unit configured to perform control so as to use the wireless communication unit to sequentially transmit the plurality of first identification signals, which have particular center frequencies within a frequency band usable by the wireless communication unit, as an activation request signal for requesting activation of a wireless communication unit included in the another information processing apparatus; and
a connection unit configured to use the wireless communication unit to establish connection with the another information processing apparatus after the wireless communication unit transmits the first identification signals and receives a response to the first identification signals from the another information processing apparatus;
wherein the wireless communication unit transmits the first identification signals to the another information processing apparatus including a detecting unit which detects the activation request signal and is different from the wireless communication unit of the another information processing apparatus.

11. The information processing apparatus according to claim 10, wherein, when a particular operation is performed, the transmission control unit performs control so as to use the wireless communication unit to sequentially transmit the first identification signals as the activation request signal.

12. The information processing apparatus according to claim 10, further comprising a search unit configured to:
use the wireless communication unit to sequentially transmit the plurality of second identification signals, which have different center frequencies within the frequency band usable by the wireless communication unit;
repeatedly transmit the second identification signals in the frequency band; and
search for the access point which transmits a response to the second identification signals to connect thereto; and
when it is determined based on the search by the search unit that there is no access point utilizable by the information processing apparatus, the transmission control unit performs control so as to use the wireless communication unit to sequentially transmit the first identification signals as the activation request signal.

13. The information processing apparatus according to claim 12, wherein the first identification signals are Beacon signals which the wireless communication unit sends out when a mode of the wireless communication unit is a first mode, and the second identification signals are Probe Request signals which the wireless communication unit sends out when the mode of the wireless communication unit is a second mode.

14. The information processing apparatus according to claim 13, wherein:
the wireless communication unit is a WLAN communication module;
the first mode is one of an Adhoc mode and an AP mode relating to the WLAN communication module; and
the second mode is a Station mode relating to the WLAN communication module.

15. The information processing apparatus according to claim 10, wherein the first transmission period is a de facto transmission period of a Beacon signal sent out from the access point.

16. The information processing apparatus according to claim 10, wherein, in a case where the first transmission period is a period other than a de facto transmission period of a Beacon signal sent out from the access point, the second transmission period is different not only from the first transmission period but also from the de facto transmission period of the Beacon signal sent out from the access point.

17. The information processing apparatus according to claim 10, wherein the second transmission period is shorter than the first transmission period.

18. The information processing apparatus according to claim 10, wherein the first identification signals are identification information which is used for identifying the another information processing apparatus and contains unique word information which is set between the information processing apparatus and the another information processing apparatus.

19. A connection establishment method for an information processing apparatus comprising:

configuring a wireless communication unit which performs wireless communication with another information processing apparatus which is utilizable as a wireless base station and with an access point, wherein, when communicating with the another information processing apparatus, a plurality of first identification signals repeated with a second transmission period are used, and when communicating with the access point, a plurality of second identification signals repeated with a first transmission period which is different from the second transmission period are used;

a wireless communication step including performing wireless communication with the another information processing apparatus;

a search step including:

using the wireless communication unit to sequentially transmit the plurality of first identification signals, which have different center frequencies within a frequency band usable by the wireless communication unit, as an activation request signal for requesting activation of a wireless communication unit included in the another information processing apparatus;

repeatedly transmitting the first identification signals in the frequency band; and searching for the another information processing apparatus which transmits a response to the first identification signals; and a connection step including using the wireless communication unit to establish connection with the another information processing apparatus which is searched for by processing in the search step.

* * * * *